United States Patent [19]

Newell et al.

[11] 4,387,296

[45] Jun. 7, 1983

[54] PORTABLE UTILITY BILLING APPARATUS

[75] Inventors: William C. Newell, Post Falls; Lary A. Cross, Coeur d'Alene, both of Id.

[73] Assignee: I-Tron, Inc., Spokane, Wash.

[21] Appl. No.: 38,678

[22] Filed: May 14, 1979

[51] Int. Cl.[3] ...................... G06F 15/24; G06F 15/46; G11B 5/00; G06G 7/48

[52] U.S. Cl. .................................... 235/376; 235/385; 235/475; 360/4; 364/464

[58] Field of Search ............ 346/14 MR, 66; 235/432, 235/433, 376, 385, 475; 364/464; 324/76; 360/4

[56] References Cited

U.S. PATENT DOCUMENTS

| | | | |
|---|---|---|---|
| 3,422,441 | 1/1969 | Chapsky | 360/4 |
| 3,590,220 | 6/1971 | Ishida | 235/432 |
| 3,823,388 | 7/1974 | Chadima | 364/900 |
| 3,842,248 | 10/1974 | Yarnell | 235/419 |
| 3,897,944 | 8/1975 | Grant | 271/3 |
| 3,900,191 | 8/1975 | Westover | 271/3 |
| 3,915,086 | 10/1975 | McManaman | 101/93.19 |
| 3,932,730 | 1/1976 | Ambrosio | 235/432 |
| 3,938,185 | 2/1976 | Ito | 360/69 |
| 3,942,157 | 3/1976 | Azure | 364/900 |
| 3,956,740 | 5/1976 | Jones | 364/900 |
| 3,983,557 | 9/1976 | Ito | 343/7.3 |
| 4,016,542 | 4/1977 | Azure | 364/900 |
| 4,110,606 | 8/1978 | Prince | 235/432 |
| 4,115,870 | 9/1978 | Lowell | 364/900 |
| 4,133,034 | 1/1979 | Etter | 364/464 |
| 4,169,290 | 9/1979 | Reed | 364/900 |

OTHER PUBLICATIONS

Radix Corporation—"Utilicorder Product Description", Salt Lake City, Utah, May 18, 1976.

Wordsmith, Inc.—"Rockwell PPS—4/2 μP Controls & Portable Data Recorder", Electronic Design 18, Sep. 1, 1976.

*Primary Examiner*—Robert M. Kilgore

*Attorney, Agent, or Firm*—Wells, St. John & Roberts

[57] ABSTRACT

A lightweight portable utility billing apparatus is described for enabling a utility (private or public) meter reader to: (1) read utility meters of a number of utility customers on a selected route and obtain current meter value information from each customer; (2) record the current meter value information; (3) automatically calculate the customer utility charges; (4) print customer bills containing the calculated charges thereon; and (5) deliver the customer bills to the customer. The apparatus includes a single input/output magnetic tape for mass data storage and an electronic alterable read only memory (EAROM) for storing the utility rate tables. The EAROMS may be readily updated by the magnetic tape. A keyboard, display and impact printer are included as I/O devices with respect to a microprocessor controller that is programmed by an instructional control program stored in a nonvolatile read only memory. The apparatus includes many features that greatly increase the versatility of the device, even though the apparatus is very lightweight (less than 10 lbs.).

21 Claims, 30 Drawing Figures

MAG TAPE
PRINTER
DISPLAY
A/N
N
STATUS
BATTERY
MASS DATA STORAGE IF
MOTOR REG.
PRINTER IF
MOTOR REG.
DISPLAY IF
KEYBOARD IF
KEYBOARD
DATA BUS
CONTROL BUS
POWER BUS
ADDRESS BUS
MEMORY
a. RAM
b. EPROM
c. EAROM
CPU SYS
VOLTAGE REGULATOR
+6
-13

PORTABLE UTILITY BILLING APPARATUS

BACKGROUND OF THE INVENTION

This invention relates to portable utility billing devices that are utilized to assist meter readers in locating, reading, computing and delivering bills to utility customers at the customer's location. The devices are particularly adaptable for public and private utilities that supply water, electricity, gas or steam to residential and commercial customers.

The traditional method that has been utilized for more than thirty years has been for the meter reader to carry a meter route book or a set of cards pertaining to a customer route. The meter reader inspects and reads the meter dials to determine its current usage value. The meter reader then writes the current usage data on the card or in the route book. The book or stacks of cards are taken back to the utility office and processed to calculate the customer consumption. A bill is then printed at the main office and sent through the mail to the customer for payment. Generally the time period between the time that the meter is read by the meter reader and the time that the bill is received by the customer was between seven and ten days.

There has been considerable interest in attempting to improve the traditional method. However, such attempts have generally been unsuccessful or limited.

To the applicant's knowledge there has been no successful portable utility billing apparatus that enables the utility meter reader to read a route of customer utility meters to obtain current usage information from the meter, record the current meter value information, calculate the customer utility charges, print the customer bill with the calculated customer charges thereon and to deliver the bill to the customer, all in one operation.

The applicants have developed a portable utility billing device that is capable of performing all of those functions with a lightweight device.

A further advantage of this invention is to provide a portable utility billing apparatus that is very lightweight and may be easily carried by the meter reader with the capability of servicing and printing bills for a full utility route.

An additional advantage of this invention is to provide a unique portable utility billing apparatus that is quite reliable and yet may be easily adapted from one utility company to another having considerably varying procedures and business methods.

A further object of this invention is to provide a portable utility billing apparatus that is capable of being operated in rather harsh environments of cold, snow, rain and heat encountered by meter readers.

A still further object of this invention is to provide a unique portable billing apparatus that is easy to maintain and is very efficient in determining whether or not any errors have occurred.

An additional object of this invention is to provide a unique portable billing apparatus that has a very efficient printing system for accurately printing utility bills that may be left with the customer on the customer's premises.

An additional object is to provide a portable utility billing apparatus that is very efficient in operation to enable the meter reader to efficiently perform his task in a minimum of time and with a minimum of effort.

A still further object is to provide a portable utility billing apparatus that may be easily manipulated and handled and conveniently carried by the meter reader with a minimum of physical discomfort.

A still further object is to provide a portable utility billing apparatus that is capable of accurately recording a vast amount of information that may be useful to the utility in not only billing its customers, but also efficiently maintaining the utility service and meters.

These and other objects and advantages of this invention will become apparent upon reading the following detailed description of a detailed embodiment.

BRIEF DESCRIPTION OF THE DRAWINGS

There is illustrated in the accompanying drawings, a preferred embodiment of this invention, in which:

FIG. 19 is a schematic diagram of an electronic serial number system;

FIGS. 20A, 20B and 20C are put together to form FIG. 20;

DETAILED DESCRIPTION OF THE PREFERRED EMBODIMENT

Figures 1, 2:
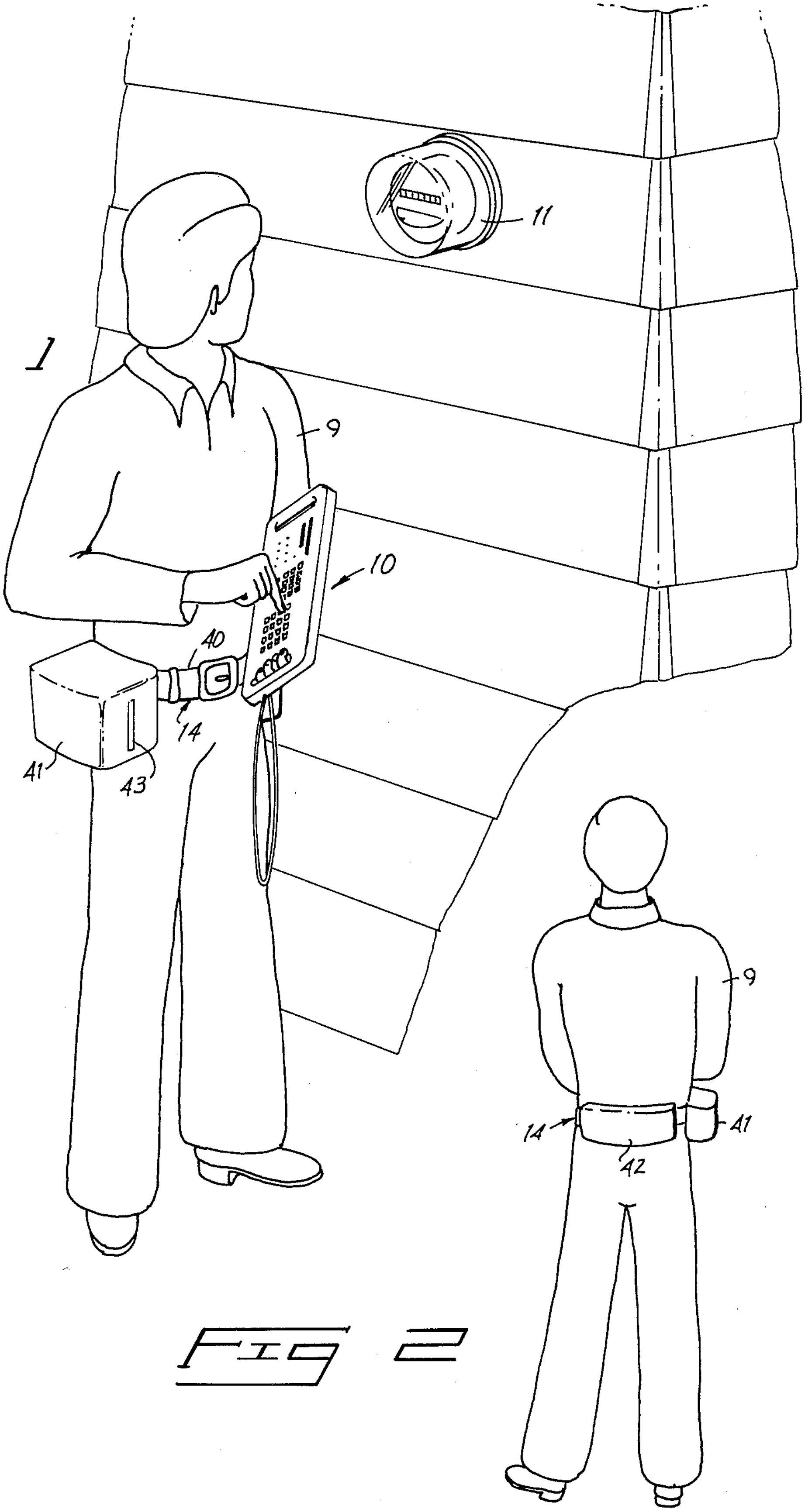
FIG. 1 is an isometric view of a utility meter reader carrying the subject portable utility billing apparatus about his waist utilizing a belt support system.
FIG. 2 is a rear view of the meter reader illustrating the belt support system.

The drawings illustrate in FIG. 1 a meter reader designated with the numeral 9 that is employed to read utility meters (gas, electric or water) such as illustrated in 11 to record the current reading of the utility meter to determine the consumption utilized by the customer.

General

Figure 6:
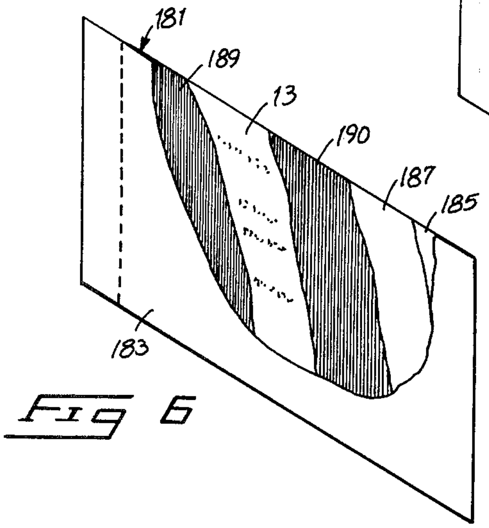
FIG. 6 is an isometric view of an enclosed envelope assembly containing a customer bill.

A portable utility billing apparatus 10 is provided for use by the meter reader to assist the meter reader in determining the locatin of the meter 11, recording the current meter value information, calculating the customer utility charges based upon the current reading and a preceeding reading, printing a customer bill while at the customer location and delivering the customer bill to the customer while the meter reader is present on the customer's premises. A customer bill 13 is illustrated in FIG. 6.

The apparatus 10 generally includes a portable support 14 (FIGS. 1 and 2) for enabling the meter reader to conveniently carry the apparatus while walking on a utility customer route. The apparatus includes a mass data storage receiving means 16 for receiving a mass data storage 17 illustrated in FIGS. 3, 5 and 11. The apparatus includes a alphanumeric display means generally designated as numeral 18 (FIGS. 3 and 4) for enabling the meter reader to display information to assist him in accomplishing his tasks and verify entered data. Additionally the apparatus includes a memory means 20 (FIG. 3) that contains an instructional control program, utility rate tables and temporary memory storage.

Figure 3:
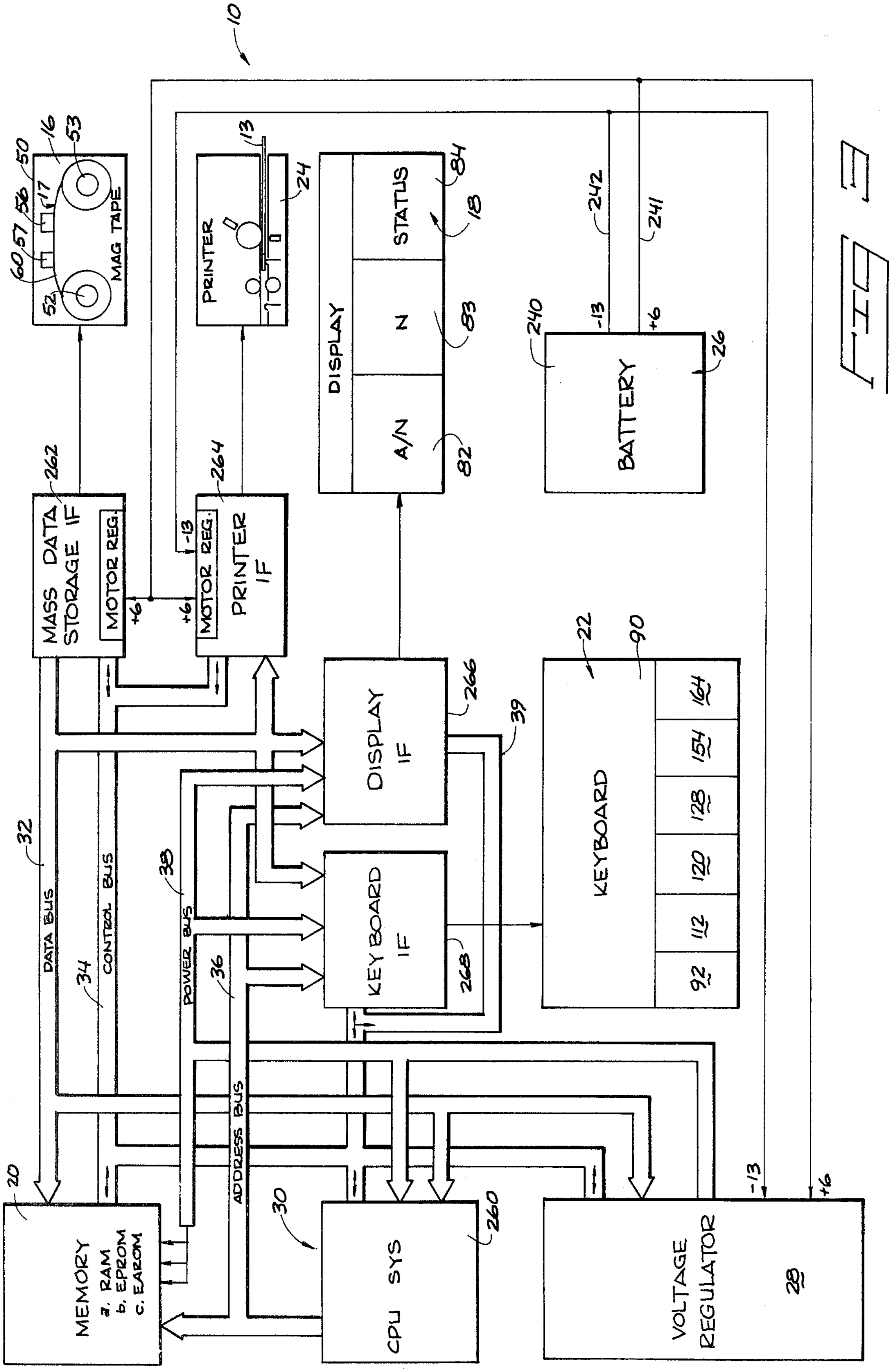
FIG. 3 is a schematic block diagram of many of the major components of the portable utility billing apparatus.
Figure 4:
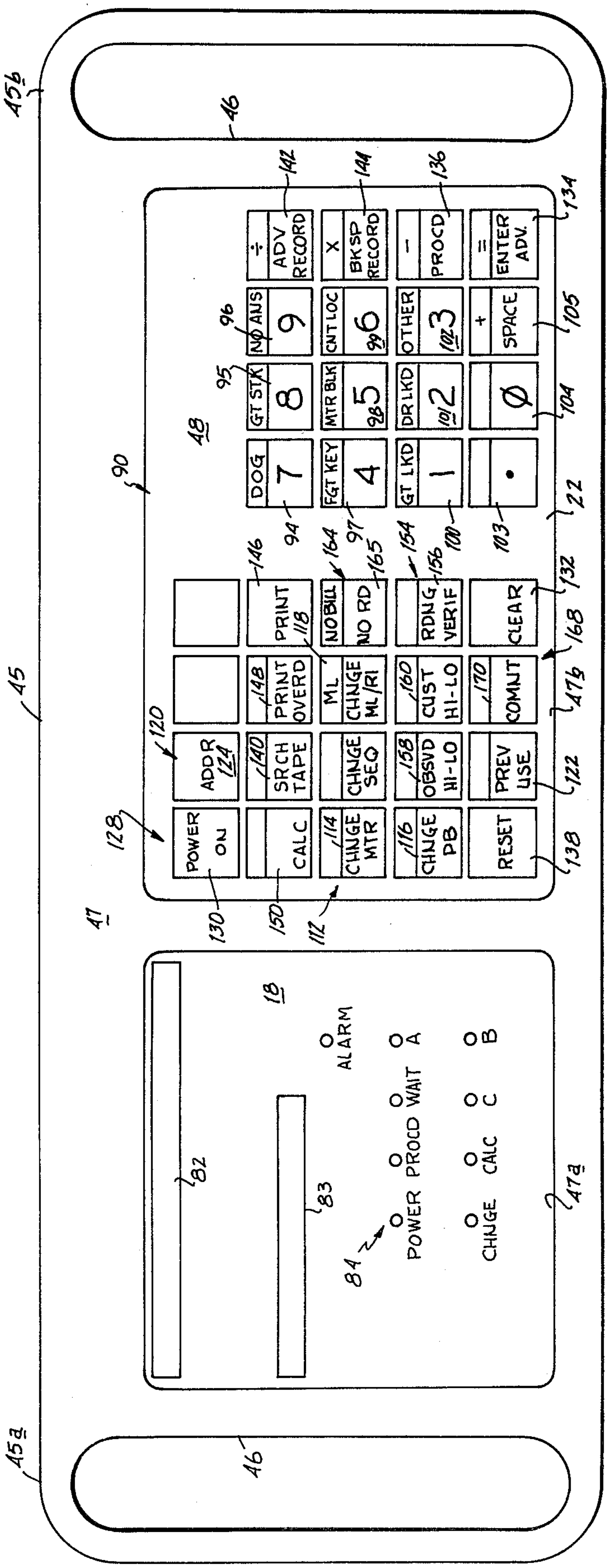
FIG. 4 is a face view of an alphanumeric display and keyboard assembly including its accompanying portable support housing.

The apparatus 10 additionally utilizes a data entry means 22 (keyboard) for enabling the meter reader to enter data into the apparatus, particularly the current meter values (FIGS. 3 and 4). The apparatus includes a bill printing means 24 for printing a customer bill 13 to enable the meter reader to deliver the bill to the customer while the meter reader is on the customer's premises.

The apparatus 10 includes a portable electrical power source 26 that is carried by the meter reader for supplying power to the various components. The source 26 supplies electrical power to the various units through a voltage regulating means 28. A control means 30 is utilized for sequentially controlling and monitoring the various components in accordance with the instructional control program. As illustrated in FIG. 3 the various components are interconnected to the control means 30 through a data bus 32, a control bus 34, an address bus 36 and a power bus 38.

Portable Support

Specifically, the portable support 14, illustrated in FIGS. 1, 2, 4 and 15 includes a belt assembly 40 that may or may not include a shoulder strap having a case 41 for receiving the bill printing means 24 and the mass data storage receiving means 16. An additional case 42 is provided for the control means 30, the voltage regulator means 28 and the electrical power source 26. In some configurations, cases 41 and 42 may be a single unit that is secured to the belt assembly 40. The case 42 includes a passage 43 extending therethrough for enabling the meter reader to insert the customer bill at one end and have the bill automatically discharged at the opposite end. The case 42 further includes an opening 44 for enabling a mass data storage device 17 such as a cassette tape cartridge to be inserted into the mass storage receiving means 16.

Portable support 14 further includes an elongated keyboard and display housing 45 (FIG. 4) that may be easily handled by the meter reader. The housing 45 has a length corresponding to the distance between the meter reader's elbow and his hand palm to enable the meter reader to easily support the keyboard and display housing 45 as illustrated in FIG. 1. The housing 45 extends between ends 45*a* and 45*b*. Finger slots 46 are formed at each end 45*a*, 45*b* for enabling the operator to insert his fingers into one of the slots depending upon which arm is being utilized to support the housing 45 and which hand is being utilized for activating the data entry means 22.

The housing 45 has a face 47 that is divided into a display section 47*a* and a keyboard section 47*b*. The face 47 has an overlay 48 that extends over the display section 47*a* and the keyboard section 47*b*. The overlay 48 is hermetically sealed to the housing 45. The meter reader encounters a wide variety of environmental conditions including snow, rain, cold and heat. Consequently, it is important that the overlay 48 hermetically seals that housing to prevent moisture from seeping into the interior electronic and mechanical components that are mounted within the housing 45.

Mass Data Storage

The mass data storage receiving means 16 more specifically includes a magnetic tape transport deck 50 (FIGS. 3 and 5) generally designated with the numeral 50 that is preferably of the cassette type for receiving a cassette cartridge 61. The deck 50 includes a housing 51 with spaced reel drive shafts 52 and 53 (FIG. 3). Each of the drive shafts 52, 53 are individually driven by a DC drive motor (not shown). The tape transport deck 50 includes a read head 56 and a write head 57.

Figure 11:
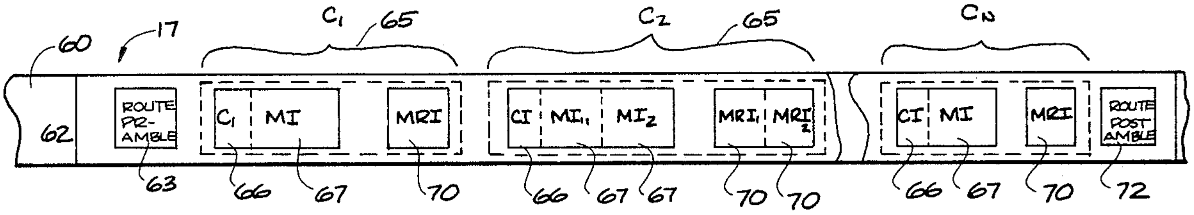
FIG. 11 is a diagrammatical view of a section of a mass data storage magnetic tape.

The mass data storage means 17 preferably includes a single input/output magnetic tape 60 that is illustrated in FIG. 11. Preferably the magnetic tape is mounted in a cassette cartridge 61 that is insertable into the tape transport deck 50.

Upon completion of a customer route the magnetic tape 60 includes both prerecorded information that is placed upon the tape 60 at the utility office and information that is written onto the tape by the apparatus while the route is being serviced.

As illustrated in FIG. 11, the tape has a beginning of tape mark (BOT) 62 that indicates the beginning of the recorded material. Immediately succeeding the BOT 62 is a route preamble field 63 that includes general information to identify the tape and route which may be useful to the meter reader. In a preferred embodiment the route preamble field includes such information as: (a) preamble record identifier; (b) the route member; (c) the date the tape was prepared by the utility office; (d) the scheduled date that the route is to be serviced; and (e) the cassette cartridge number. For some routes it may be necessary to have more than one cassette cartridge to completely service a particular route.

Following the route preamble field 63 is a plurality of customer/meter data fields 65 corresponding to each of the customers on the route. Each of the customer/meter data fields 65 includes a prerecorded customer information segment 66, a prerecorded meter information segment 67 and an apparatus output information segment 70. Some customers may have several meters located on their premises. Some customers may have several meters of the same type such as several electrical meters. Other customers may have several meters of different types such as gas, electricity and water. Consequently, within each customer/meter data field 65 there may be several meter field segments 67 corresponding to the several meters. There is a corresponding number of output segments 70 to the segments 67 for each customer. For example, in FIG. 11 the second customer has two meters with two meter data segments 67. For the second customer there are two output segments 70.

In a preferred embodiment the prerecorded customer information segment 66 contains the following information:

(a) the customer record identifier; (b) the account number for the customer; (c) the number of bills to be supplied to the customer; (d) any special handling information with respect to the customer; (e) the status of the customer's account; (f) the present balance of the customer's account; (g) charges owing to the utility prior to the present billing, (h) budget amount if the customer is on a budget account; (i) the number of meters to be read for the customer; (j) the location where the bill is to be put (usually in code form); (k) stub number for the customer bill; and (l) the address of the customer.

In a preferred embodiment the prerecorded meter field segment 67 contains information concerning:

(a) the meter number; (b) meter code; (c) the rate schedule for the particular meter; (d) the tax rate for the meter; (e) the key number of a key that enables the meter reader to gain access to a building structure housing the meter; (f) the number of dials on the meter; (g) the sequence in which the meters are to be read assuming more than one meter; (h) any special reading instructions for that particular meter; (i) location of the meter on the customer's premises; (j) multiplier for the meter; (k) previous reading of the meter; (l) the full scale of the meter, (m) fixed demand information; (n) the previous date that the meter was read; (o) the degree days for the current month in which the meter is being read; (p) usage by the customer for the corresponding month of the previous year; (q) the degree days for the corresponding month of the previous year; (r) the usage for the previous month; (s) the degree days for the previous month; (t) estimated high limit value; (u) the estimated low limit value; (v) the date that the account was opened or closed; (w) the meter status (whether active or inactive); (x) estimated reading of the meter; and (y) sealed meter lock number.

Each of the output data segments 70 contains information that is entered by the meter reader or entered by the apparatus itself. In a preferred embodiment, each output data segment 70 contains: (a) field identifier number; (b) the meter number of the meter actually read by the meter reader; (c) the meter code for the meter that is read; (d) the current reading of the meter; (e) the reading code; (f) the service amount; (g) the tax amount; (h) meter reader comment code entered by the meter reader; (i) reason why the bill was not delivered; (j) new meter location if the meter location has been changed; (k) new reader instructions that the meter reader has inserted to change or update the previous information; (m) a new reading sequence inserted by the meter reader to change the reading sequence; (n) a new location for the bill; (o) the actual reading date; (p) current usage as calculated by the apparatus; (q) the new multiplier of the change meter; (r) bill stub member; (s) the serial number of the apparatus; and (t) calculated billed amount.

As the meter reader moves to the next customer he activates the magnetic tape transport 50 to read the next prerecorded customer information field 66 and the prerecorded meter information field 67. The apparatus then enters information onto the magnetic tape in the appropriate segment 70.

At the conclusion of the route, there is a postamble record field 72. In a preferred embodiment, field 72 would include the following information: (a) postamble record identifier; (b) the number of customers serviced on the route; (c) the number of meters read; (d) the total prebilled amount before the customers were serviced; (e) the total amount billed to the customers by the meter reader and (f) the number of customers serviced on the route.

In the preferred embodiment, the tape transport deck 50 is a commercially available transport—Braemar Model CS-400A Digital Cassette Tape Transport System produced by Braemar Computer Devices, Inc. of Burnsville, Minn. The structure and operation of the deck and interface is described in the Braemar "Instructional and Interface Manual" that accompanies such unit.

Display Means

The alphanumeric display means 18 includes a visual information display 80 (FIGS. 3, 4 and 14) that has an alphanumeric display section 82, a numeric display section 83 and a status display section 84. The status display section 84 includes individual LED units that are individually activated. The visual display information device 80 is illustrated in block diagram in FIG. 14. In a preferred embodiment the display section 82 and 83 includes a plurality of alphanumeric/numeric displays vended by Litronix, Inc. of Cupertino, Calif. under Ser. No. DL-1416. Such units include their own internal random access memories, read only memories, character generation and other logic circuits. The operation of such alphanumeric displays are described in "Litronix Appnote 9 for Applying the DL-1416". Such literature is available from the company. The display means 18 (FIG. 14) is viewed as a memory unit and is addressed through the address bus 36 for presenting a display message coded on the data bus 32 by the control means 30.

Data Entry

The data entry means 22 includes a keyboard generally designated with the numeral 90 that has a plurality of key switches for enabling the meter reader 9 to enter data into and manipulate the apparatus. Generally the keyboard consists of two general groups of keyswitches; one group is a numbered arithmetic keyswitch which is used to enter numerical data. The second group of keyswitches are functional in nature and are used to operate the apparatus, request information from the customer record, and enter new status information as required. As illustrated in FIGS. 3 and 4, the keyboard is divided into an arithmetic section 92 having individual keyswitches 94–105. The keyboard has a change/update data section 112. In a preferred embodiment, the change/update data section 112 includes a change meter number keyswitch 114 titled "CHANGE MTR", and a change location for a bill keyswitch 116 "CHNGE PB". Section 112 includes a third keyswitch 118 that is to change the meter location or to change the meter reading information that is entitled "CHNGE ML/RI". A fourth keyswitch 119 to change the meter reading sequence is titled "CHNGE SEQ". The change/update data keyswitches 112 enable the meter reader to write onto the output data segment 70 information to update or to change the information that is in the customer information segment 66 or the meter segment 67.

The keyboard further includes a display information section 120 that in a preferred embodiment has a previous use keyswitch 122 entitled "PREV USE", and customer address keyswitch 124 entitled "ADDR". The keyswitches in section 120 enable the meter reader to access memory and display the requested information on display sections 82 or 83.

The keyswitches in section 120 enable the meter reader to display the address of the customer and the previous consumption or usage of that customer.

The keyboard 90 further includes an apparatus implementation or control panel section 128 that includes a plurality of keyswitches for enabling the meter reader to initiate operation of the apparatus. The apparatus implementation section 128 includes a "POWER ON" keyswitch 130 for enabling the meter reader to turn the apparatus on or off. The section 128 includes a "CLEAR" keyswitch 132 for enabling the meter reader to clear information entered into the apparatus prior to the information being stored in memory or written onto the magnetic tape. An "ENTER/ADV" keyswitch 134 is provided in section 128 to enable the meter reader to enter the information into memory after the information has been visually verified by the meter reader. The keyswitch 134 is also utilized to advance the record to the next meter of a multiple meter record. Additionally, a proceed keyswitch 136 is provided entitled "PROCD" to be activated by the meter reader to return the apparatus to normal operation after an alarm has been activated or special requests have been made. Keyswitch 136 is also used to advance the tape to the next customer record after the bill printing operation has been completed.

Section 128 also has a "RESET" keyswitch 138. "RESET" keyswitch 138 enables the meter reader to reset the apparatus to the beginning or to a specified portion of the control program depending upon when the keyswitch is operated. A search tape keyswitch 140 entitled "SRCH-TAPE" enables the meter reader to move the magnetic tape to a specific customer record which may have skipped over and is spaced far from the current customer record. An advance tape keyswitch 142 titled "ADV-RECORD" is provided to advance the magnetic tape in a forward direction. Likewise a reverse record tape keyswitch 144 entitled "BKSP-RECORD" is used to move the magnetic tape in a reverse direction.

The apparatus implementation section 128 has a "PRINT" keyswitch 146 which may be depressed by the meter reader to initiate the bill printing sequence after the meter data has been entered and the consumption calculated. The keyboard section 128 further includes a printing override keyswitch 148 entitled "PRINT OVERD" which may be utilized when a printed bill is either not desired or the printing operation fails. In either case, depression of "print override" keyswitch 148 enables the meter reader to proceed onto the next customer. The section 128 also includes a calculate keyswitch 150 titled "CALC" which may be depressed by the meter reader to convert the keyboard to a calculator and to upshift the function of the keyswitches 142, 144, 136 and 134. After the calculations are completed, then the meter reader pushes the "RESET" keyswitch 138 to downshift the keyswitches 134, 136, 142 and 144.

The keyboard 90 further includes an abnormal usage section 154 that includes, in a preferred embodiment, a reading verified (RDNG VERIF) keyswitch 156, an observed high-low (OBSVD HI-LO) keyswitch 158 and a customer high-low (CUST HI-LO) keyswitch 160. When the meter reader enters the meter reading, the apparatus automatically compares the reading to estimated high and low values. If the reading exceeds the high-low values, then the meter reader is prompted on the display to verify the meter reading. If the meter reader verifies that the reading is correct, then he activates the reading verified keyswitch 156 to enter such verification into memory. If the meter reader is able to determine through his observation the reason why the reading exceeds the estimated high-low value, then the meter reader pushes the observed high-low button 158. Such information is stored in memory for writing onto the tape in the output segment 70 for that customer.

Under some conditions the meter reader may desire to talk to the customer to see if the customer can explain why the reading exceeds the high or low limits. If the customer explains why the reading exceeds such values, then the meter reader enters this fact by depressing the customer high-low keyswitch 160. Such information is then stored in memory for writing onto the output segment 70 for that customer.

The keyboard additionally has an "unable to read meter" section 164 that enables the meter reader to enter the fact that he is unable to read the meter and the reason why. The section 164 includes a no read/no bill (NO RD/NO BILL) keyswitch 165. When the operator presses the "NO RD/NO BILL" keyswitch 165, during the meter reading sequence, such information is entered into memory. Additionally the keyswitch 165 upshifts the arithmetic section 92 to enable the operator to push one of the keyswitches 94–105 to enter a reason as to why the meter could not be read. Such reason may include: (1) a dog was present (DOG) (keyswitch 94); (2) a gate was stuck (GT STK) (keyswitch 95); (3) the customer was not available to permit the meter reader to enter into a building containing the meter (NO ANS) (keyswitch 96); (4) the meter reader forgot the key for entrance into a locked premises (FGT KEY) (keyswitch 97); (5) the meter is blocked from view (MTR BLK) (keyswitch 98); (6) reader could not locate the meter (CNT LOC) (keyswitch 99); (7) the gate to the premises was locked (GT LKD) (keyswitch 100); (8) the door is locked to the entrance of the meter area (DR LKD) (keyswitch 101); or (9) some other reason (OTHER) (keyswitch 103). In this manner, the meter reader is able to supply to the utility company, information concerning why the meter could not be read so that such problem could be readily corrected in the future. Since this information is placed on the magnetic tape, maintenance and other personnel of the utility may be quickly alerted to the condition to see that the condition is rectified in the immediate future.

Additionally the keyboard includes a miscellaneous data entry section 168 that includes a comment keyswitch 170 titled "COMNT" which enables the meter reader to enter various coded comments. The utility may have a set of coded comments that may be entered. For example, one comment may be that the glass on the meter is broken. The meter reader would then push the comment keyswitch and then enter a numerical code that corresponds to a broken meter glass. A similar type of comment could be entered if it appeared that the meter had been tampered with or needed substantial repair.

The keyboard 90 is of a rather conventional construction and includes a keyswitch array decoder (not shown) preferably manufactured by National Semi-Conductor Company of Santa Clara, Calif. Such device is described in their CMOS Data Semi-Conductor Book. The keyboard also includes a first in, first out (FIFO) buffer register preferably manufactured by RCA Semi-Conductor Division of RCA Corporation and described in their RCA COS/MOS Integrated Circuit Handbook. The keyboard is viewed as an I/O device that is connected to the Data Bus 32 with the control means 30 sequencing the keyboard character signals onto the Data Bus 32.

Bill Printer

The bill printing means 24 is illustrated in more detail in FIGS. 7–10 and includes an impact printer 180 for processing the customer bill 13 which is preferably enclosed in a sealed envelope 181. The envelope 181 includes a front layer 183 that normally includes the address of the customer and a back layer 185. The customer bill 13 is included as an insert within the envelope along with a utility record 187. The impact printer 180 prints the usage and billing information onto the customer bill 13 and the utility record 184 utilizing inserted carbons 189 and 190.

The entire envelope 181 is fed through the printer while the envelope is sealed utilizing an envelope or customer bill feed system 192. The impact printer 180 also includes a print wheel system 194, an impact hammer subsystem 197 and a synchronization and timing system 220.

The envelope feed subsystem 192 includes an envelope guide 200 that extends in a longitudinal direction having longitudinal spaced parallel side walls 201 and 202 that form the passageway 43 therebetween. The guide 200 has an entrance 203 to enable the meter reader to insert the envelope 181 into the guide 200 and an exit 204 for enabling the printer 180 to discharge the envelope after it has been printed.

Figure 7:
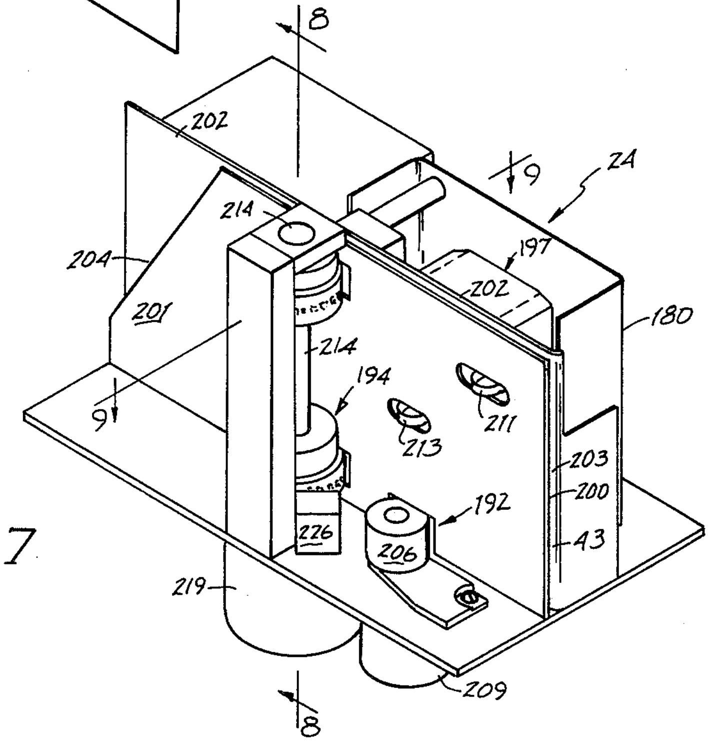
FIG. 7 is an isometric view of the customer bill printer.
Figure 8:
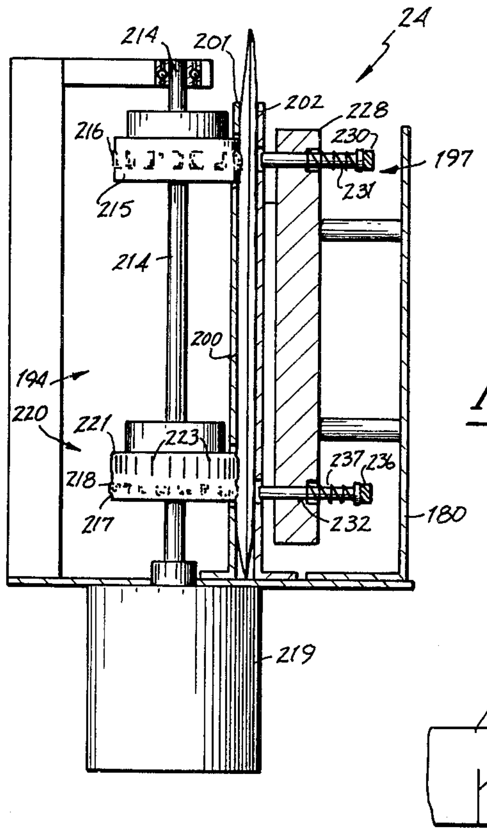
FIG. 8 is a cross-sectional view of the printer taken along line 8—8 in FIG. 7.

The envelope feed system 192 includes a drive roller 206 that is positioned alongside walls 201 and projects into the passageway 43 for engaging the envelope 181 and driving the envelope from the entrance 203 to the exit 204 in conjunction with an opposing idler roller 208. The drive roller 206 is incrementally rotated by a stepping DC four phase drive motor 209 (FIG. 7).

The envelope feed system 192 includes an upstream feeler switch 211 (FIGS. 7 and 18) that indicates to the apparatus that an envelope 181 has been inserted into the guide 200 and is ready to be driven by the rollers 206, 208. The feeler switch 211 senses the leading edge of the envelope as it is inserted into the guide. A downstream feeler switch 213, positioned between the drive roller 206 and a print station, senses that the drive roller 206 is operating to drive the envelope progressively past the print station. Additionally, the downstream feeler switch 213 senses when the trailing edge of the envelope has passed the switch position.

The print wheel system 194 is positioned along the passageway 43 at a print station. The print wheel system 194 includes a print wheel shaft 214 that extends substantially parallel with the walls 201 and 202 and is journalled in the bearings. The print wheel system 194 includes an upper print wheel section 215 that has several vertically spaced rows of indicia 216 formed on the periphery thereof preferably of numeric characters. In a preferred embodiment there are three rows of numerical characters which correspond to separate three meters for enabling the print wheel section 215 to print billing information for a three meter customer.

The print wheel system 194 further includes a lower or second print wheel section 217 that includes a peripheral row of indicia 218 preferably of numerical characters. Such indicia 218 prints the totals of the columns onto the bill. The print wheel system is driven by a constant speed DC 4 phase motor 219. Preferably the indicia 216 and 218 include numerical characters of a numerical font acceptable for reading by optical scanning equipment.

Figure 10:
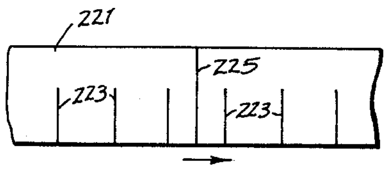
FIG. 10 is a schematic view showing the timing and synchronization marks on a print wheel.
Figure 9:
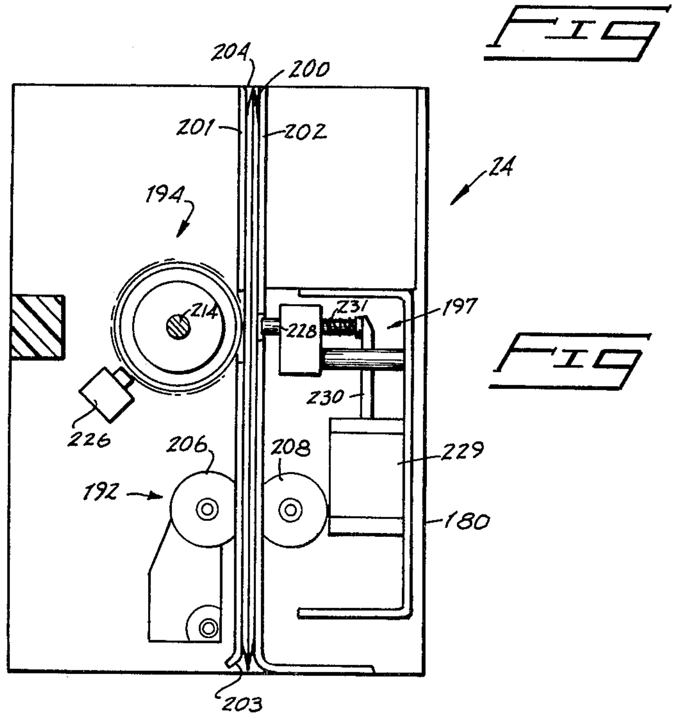
FIG. 9 is a cross-sectional view of the printer taken along line 9—9 in FIG. 7.

The synchronization and timing system 200 (FIGS. 8 and 10) includes a timing band 221 that is a part of the print wheel section 217. The timing band 221 includes a plurality of evenly angularly spaced timing marks 223 that are parallel with the shaft axis and correspond with designated numerical characters. The timing band 221 also includes a synchronization mark 225 that is included between two of the timing marks 223 as illustrated in FIG. 10.

The synchronization and timing system 220 includes a timing sensor 226 (FIGS. 7, 9 and 17) that is stationarily mounted adjacent the timing band for sensing when the timing marks 223 and synchronization mark 225 pass the sensor. Since the distance between the synchronization mark 225 and the adjacent timing marks 223 is much shorter than the equal distance between the timing marks 223, the control means 30 is able to easily differentiate the synchronization mark 225 from the timing marks 223.

The impact hammer system 197 includes a hammer 228 that opposes the print wheel section 216. The hammer 228 extends radially with respect to the print wheel section 215 and moves against the periphery of the print wheel section 215 to print a selected numerical character 216 onto the customer bill 13 and the utility record 187 utilizing the internal carbons 189 and 190.

The hammer 228 is actuated by solenoid 229 (FIGS. 9 and 17) through an activating arm 230. When the solenoid 229 is activated the hammer 228 is driven radially toward the periphery of the print wheel section 215 to print the numerical character 216 that is located at the print station onto the customer bill. A spring 231 returns the hammer to its original position when the solenoid is deactivated. The impact hammer system 229 includes a second hammer 232 that extends radially outward with respect to the print wheel section 217. The hammer 232 is driven by a solenoid 234 (FIG. 17) through an activating arm 236. A spring 237 returns the hammer 232 to its original position. The operation of the solenoids 229 and 234 is controlled in coordination with the synchronization and timing system 220 so that the hammers 122 and 232 operate at the proper time with respect to selected numerical characters 216 and 218.

Power Source and Regulation

As illustrated in FIG. 3, the portable electrical power means 26 includes a portable battery 240 that is of a lightweight nature and is carried within the case 42. In a preferred embodiment the battery 240 generates unregulated plus 6 volt DC power on line 241 and unregulated negative 13 volt DC power on line 242. The electrical energy is monitored and regulated by voltage regulation means 28. Regulation means 28 provides a sustained nonfluctuating minus 12 volt DC power and a regulated plus 5 volts power to the various components through the Power Bus 38. The battery 240 and the voltage regulator system means 28 are of conventional design and are commercially available. It should be noted that the mass storage device interface and the printer device interface have additional voltage regulation subsystems as part of their interface.

Control System

Figure 12:
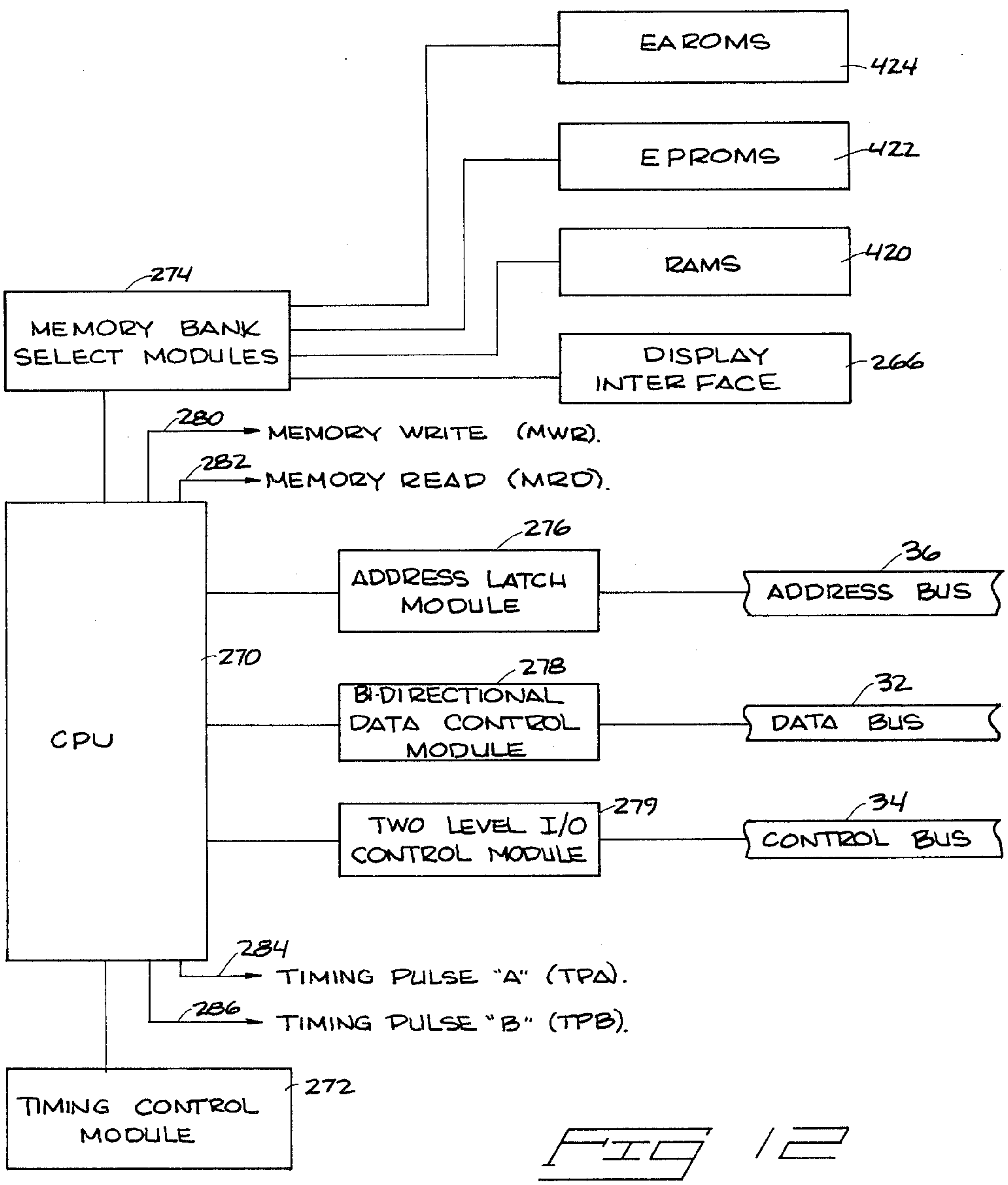
FIG. 12 is a schematic block diagram of a microcomputer system of the apparatus.

The control means 30 (FIGS. 3 and 12) principally includes a VPU system 260, a mass data storage device interface 262, a printer interface 264, a display interface 266 and a keyboard interface 268.

The CPU system 260 (FIG. 12) includes a central processing unit (CPU) 270 in the form of a microprocessor and accompanying logic timing control module 272, memory bank select modules 274, address latch module 276, bi-directional data control modules 278 and two level Input/Output device control modules 279. In a preferred embodiment the CPU unit 270 is an RCA microprocessor CDP 1802 vended by RCA Solid State Division of RCA Company of Summerville, N.J. Its operation is described in their "CDP 1802 User's Manual", File No. 1023 published August, 1977. A description of the CPU unit, the timing control module 272, the memory bank select module 274, the address latch module 276, the bi-directional data control module 278 and the two level I/O control modules are described in such manual and are of standard implementation described in various manufacturer's application and user's manuals. An additional reference is RCA Publication MPM-216 of October, 1977, entitled "Operator's Manual for the RCA COSMAC Development System II CDP 185005".

In a preferred embodiment the address latch module 176 includes Tri-State Octal latches that address signals from the CPU 270 in accordance with the instructional program. The bi-directional data control modules 278 are of a standard implementation for a bi-directional Data Bus interface. The bi-directional data control module 278 is generally described in the "Operator's Manual for the RCA COSMAC Development System II CDP 185005", RCA Publication No. MPM-216.

The CPU 270 includes a memory write (MWR) line 280, a memory read (MRD) line 282, a timing pulse "A" (TPA) line 284 and a timing pulse "B" (TPB) line 286 that are utilized in controlling the various devices. One of the design features of the apparatus is to treat each of the various components 16, 18, 22, 24 and 28 as I/O devices in which communication is generally through the Data Bus 32 with each I/O device being controlled to latch their data onto the Data Bus 32 according to the instructional control program. The memory read line (MRD) is utilized to request data from the memory or from the I/O devices onto the Data Bus.

The two level I/O control module 279 is used to expand the number of I/O signals that are normally available from the CPU unit 270. This is accomplished by passing the three basic I/O control signals from the CPU to a first decoder which expands the three signals to seven output I/O signals. One of the I/O output signals from the first decoder is utilized to expand the I/O signals at a second decoder into additional seven I/O control signals with the second decoder being under the control the CPU signals MRD and TPB.

Figure 13:
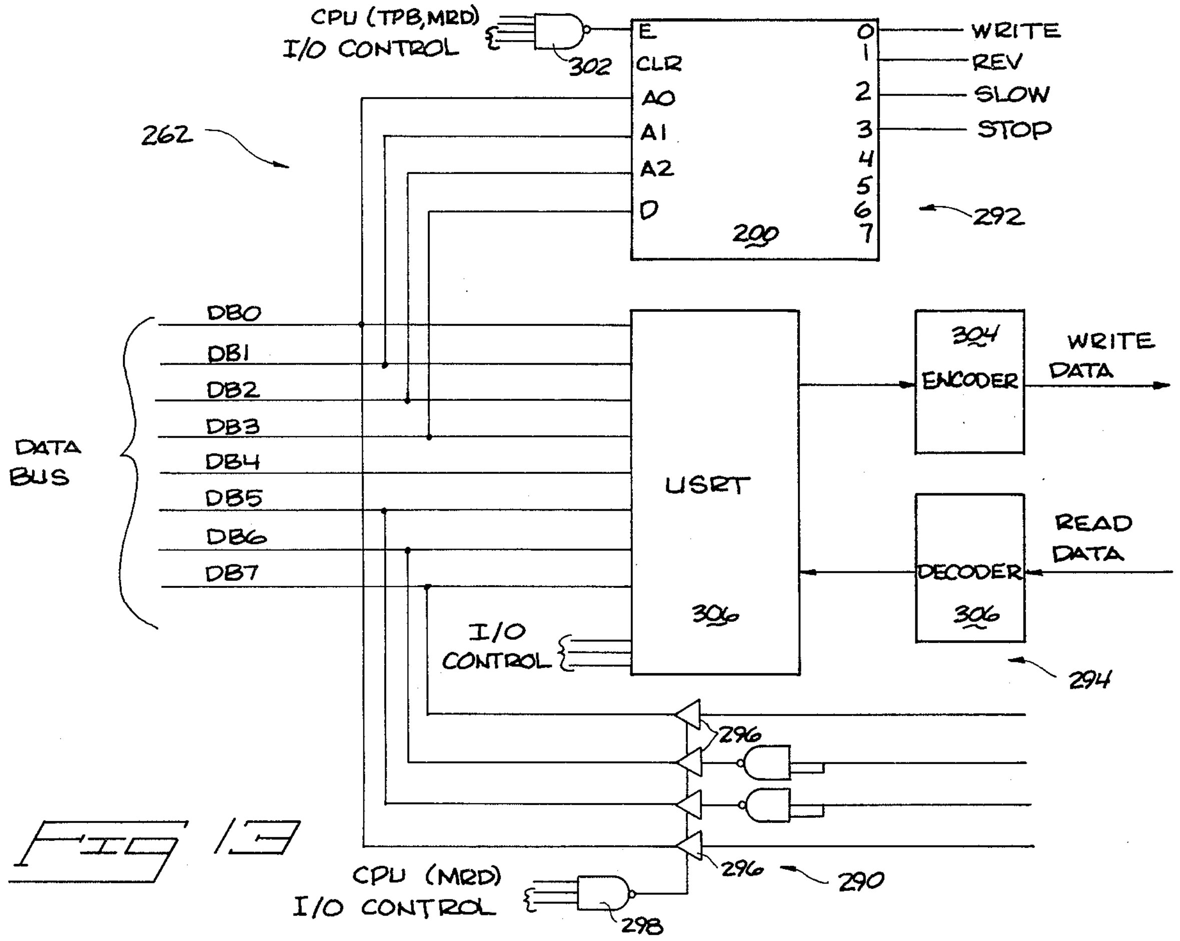
FIG. 13 is a schematic block diagram of a magnetic tape interface system of the apparatus.

The mass storage device interface 262 is illustrated in FIG. 13. The interface 262 is divided into a status signal section 290, a control signal section 292 and a data signal section 294. Status signals such as (1) cassette present, (2) clear leader, (3) cassette side "A", and (4) write protect are passed through drivers 296 as input signals to the Data Bus 32. The drivers 296 are controlled by signals from the CPU (MRD) and I/O signals through a NAND gate 298 as if the transport 50 was an I/O device.

The control signal section 292 receives coded control signals on the Data Bus 32 to a decoder 200 that decodes the signal and transmits output signals for controlling the operation of the transport deck 50. Such signals include a read/write signal, a tape direction signal (reverse), a tape speed signal (slow) and a tape motion (stop) signal. The decoder 200 is controlled as an I/O device through CPU signals TPB and MRD, and I/O control signals. Such signals are gated through a NAND gate 302.

The data signal section 294 transmits data between the transport 50 and the Data Bus 32 utilizing bi-directional recording technique referred to as "Manchester" coding. The data signal section 294 includes an encoder 304 for encoding information to be written on the magnetic tape (segment 70) and a decoder 306 for receiving data from the tape (segments 66 and 67) and decoding such data for transmission onto the Data Bus. The data signal section 294 includes a universal synchonous receiver/transmitter (USRT) 308 to interface between the encoder 304/decoder 306 and the Data Bus 32. In a preferred embodiment, the USRT 308 is vended from SMC Microsystems Corporation of Hauppange, N.Y. under the component No. COM 2601 Universal Synchronous Receiver/Transmitter. The operation of such a device is described in an "Operations and Interface Manual MFE Option 214PAR 8 Bit Parallel Interface for Tape Cassette, Volume 1" and "Option 214OS Software Support Package, Volume 2" published by MFE Corporation of Salem, N.H. Both documents are dated Feb. 11, 1977. An additional reference is the Braemar Publication "Instruction and Interface Manual for Braemar CM-600 "MINIDEK" Digital Mini Cassette Transport".

It should be noted that each of the sections 290, 292, and 294 are controlled as I/O devices with respect to the CPU unit for gating data onto and from the Data Bus 32.

Figure 16:
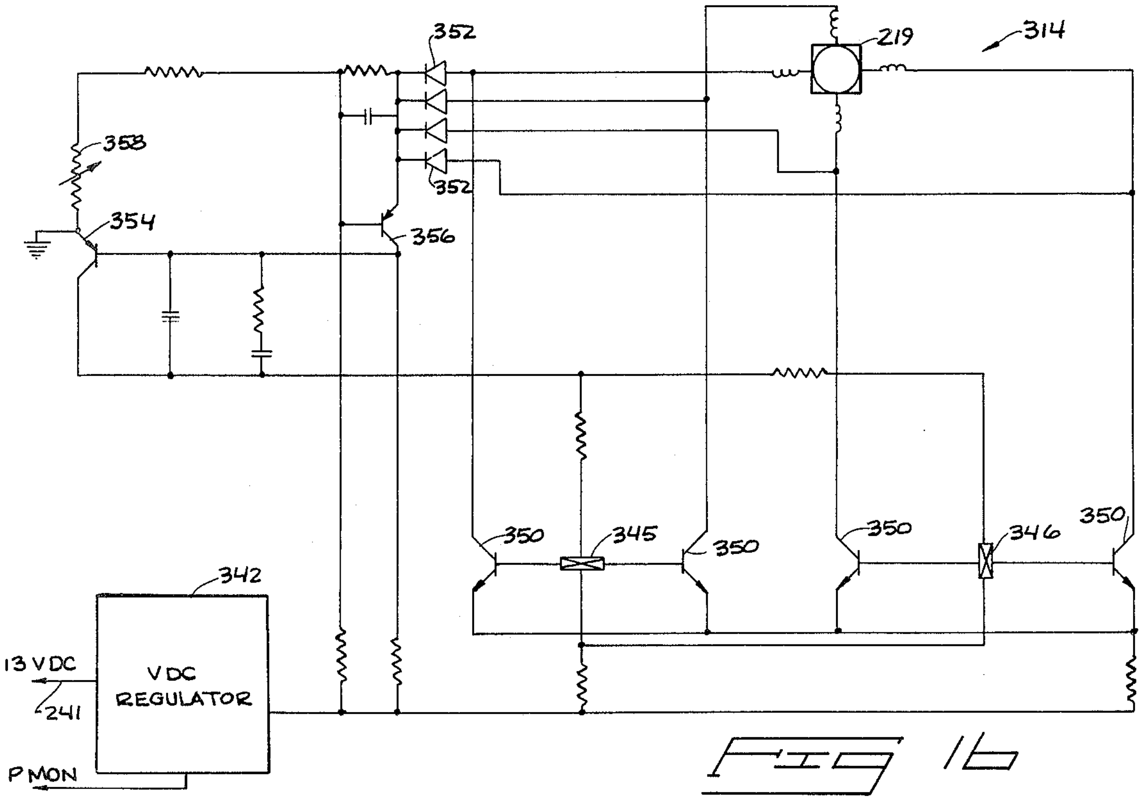
FIG. 16 is a schematic diagram of a print wheel drive subsystem.
Figure 17:
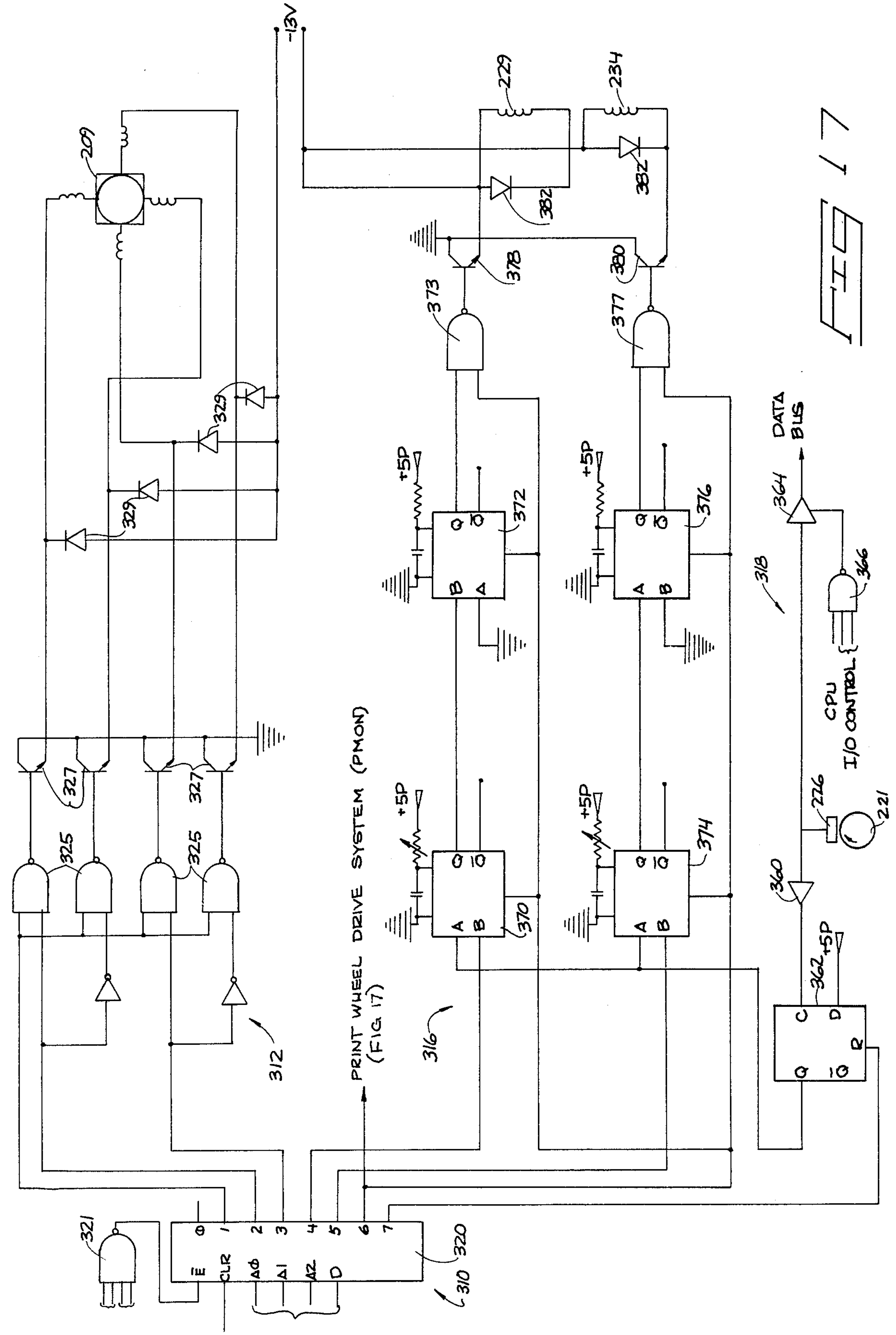
FIG. 17 is a schematic diagram of a printer interface system, print hammer system, bill feed drive system and print wheel synchronization system.

The printer interface 264 (FIG. 16) includes a print control interface section 310, an envelope feed interface section 312 (FIGS. 16 and 18), a print wheel interface section 314 illustrated in FIG. 17, an inpact hammer interface section 316 (FIG. 17) and a synchronization and timing interface section 318 (FIG. 16). The print control interface section 310 receives data from the Data Bus and decodes the data utilizing a decoder 320 in the form of an addressable latch providing implementation signals on output lines 1–7. In one embodiment the output line 1 provides a signal (FMON) for turning on the feed motor 209. Lines 2 and 3 output signals $\phi$A, $\phi$B) for controlling the phases of the motor 209. Lines 4 and 5 output signals (H1, H2) to activate the hammer solenoids 229, 234 respectively. Output line 6 provides a signal (PMON) to turn on the print wheel motor 219. Signal on line 7 is utilized as a timing signal (RMARKQ-P) to the hammer system.

The decoder 320 is controlled by a NAND gate 321 by signals from the CPU (MRD, TPB) and signals from the I/O control modules 279.

Output signals 1–3 from the print control system 310 are applied to the envelope feed section 312 and more specifically to negative relay drivers 325 that sequentially turn on motor drive transistors 327. The transistors 327 in turn sequentially apply minus 12 volt DC to the four motor coils on the motor 209 to step the motor forward to feed the envelope. Diodes 329 are used to suppress any inductive spikes that may be created when the coils are energized.

The print wheel interface section 314 (FIG. 16) includes voltage regulating means 342 for regulating a minus 13 volt DC power input to a minus 9.1 volt DC power output to apply to the circuit for print wheel motor 219. The circuit for motor 219 includes internal speed sensing transducers 345 and 346. When a signal (PMON) from the decoder 320 (FIG. 16) is provided, power is applied to the motor 219. The four phases of the motor 219 are driven by transistors 350. The sequence of the phases of the feed motor is controlled by the feedback from the internal transducers 345 and 346. The back EMF generated by the four phase windings is fed through diodes 352 to transistors 354 and 356.

Initially transistor 356 is turned "off" and transistor 354 is turned "on" which allows maximum power to be applied to the motor windings. As the speed of the motor increases, the back EMF starts to turn transistor 356 "on" which in turn starts to turn transistor 354 "off" to decrease the voltage to the motor windings. This process is continued until the circuit is in balance and the motor is running at a constant speed. A variable resistor or potentiometer 358 adjusts the balance point for controlling the terminal constant speed of the motor 219.

The speed of the print drive wheel 221 is sensed by the sensor 226 as illustrated in FIG. 16. As the print drum rotates the timing marks 223 move past the sensor 226 producing flux changes which produce an output timing pulse for each timing mark 223 and the sync mark 225. The timing pulse is an input to the synchronization and timing section 318. The mark pulse is also provided through a hex inverter as an input to a "D" type flipflop element 362 which in turn produces a clock input pulse to the impact hammer interface section 316. Additionally the timing pulse (RMARKQ-P) from line 7 of the decoder 320 is applied to the flipflop 362 to reset the flipflop.

The mark pulse from the sensor 226 is grated onto the Data Bus 32 by a bus driver 364. As part of the synchronization and timing interface section 318, the bus driver 364 is controlled by signals from the CPU (MRD) and the I/O control module through a NAND gate 366.

The CPU 270 counts the number of character timing marks 223 succeeding the synchronization mark 225 and determines when the appropriate character to be printed is at the printing station opposing the print hammers. The impact hammer interface section 316 is the interface system for driving the hammers in accordance with the decoded signals 4 and 5 (H1, H2), to print the customer bill. The print hammer solenoid circuits are enabled when the PMON signal (line 6) is generated by the decoder 320. Such signal enables monostable multivibrators 370 and 372 for the solenoid circuit 229 and to the monostable multivibrators 374 and 376 for the solenoid 234. From the print drum synchronization means, the CPU determines when the selected character is located at the printing station and generates signals on lines 4 and 5 (H1, H2) that are applied to the input of multivibrators 370 and 374 respectively. When the flipflop 362 fires multivibrators 370 and/or 374, they produce an output pulse with a selected pulse width to the inputs of multivibrators 372 and/or 376.

The falling edge of the pulse generated by the multivibrators 370 and 374 fire the multivibrators 372 and 376 to provide an output signal pulse to the base of transistors 378 and 380 respectively. When either one of the transistors 378 or 380 is turned on, the corresponding solenoid 229 or 239 is fired causing the hammer to print the selected character onto the customer bill at the print station. The feed system sequentially moves the bill 13 past the printing station. The CPU 270 keeps track of the location of the selected characters and selectively fires the solenoids 229 and 234 to print the desired characters on the bill.

Figure 18:
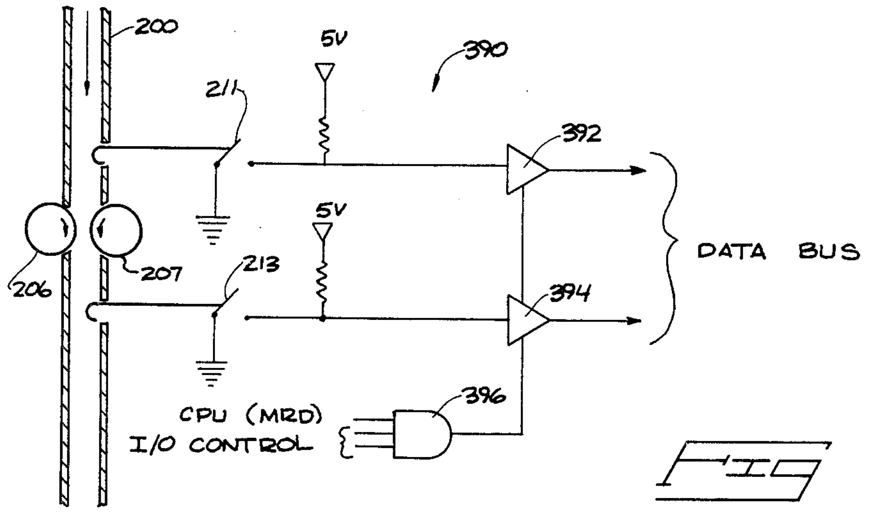
FIG. 18 is a schematic diagram of a bill detection system.
Figure 17:
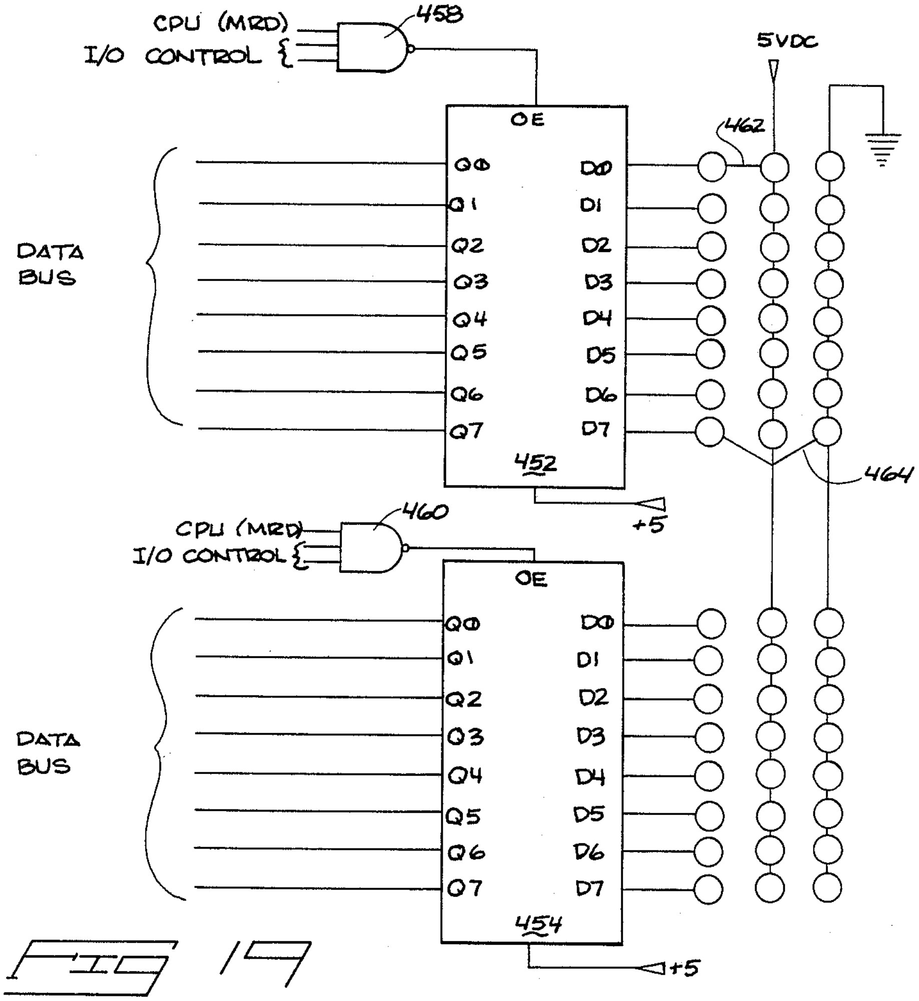
Figures 20, 20A:
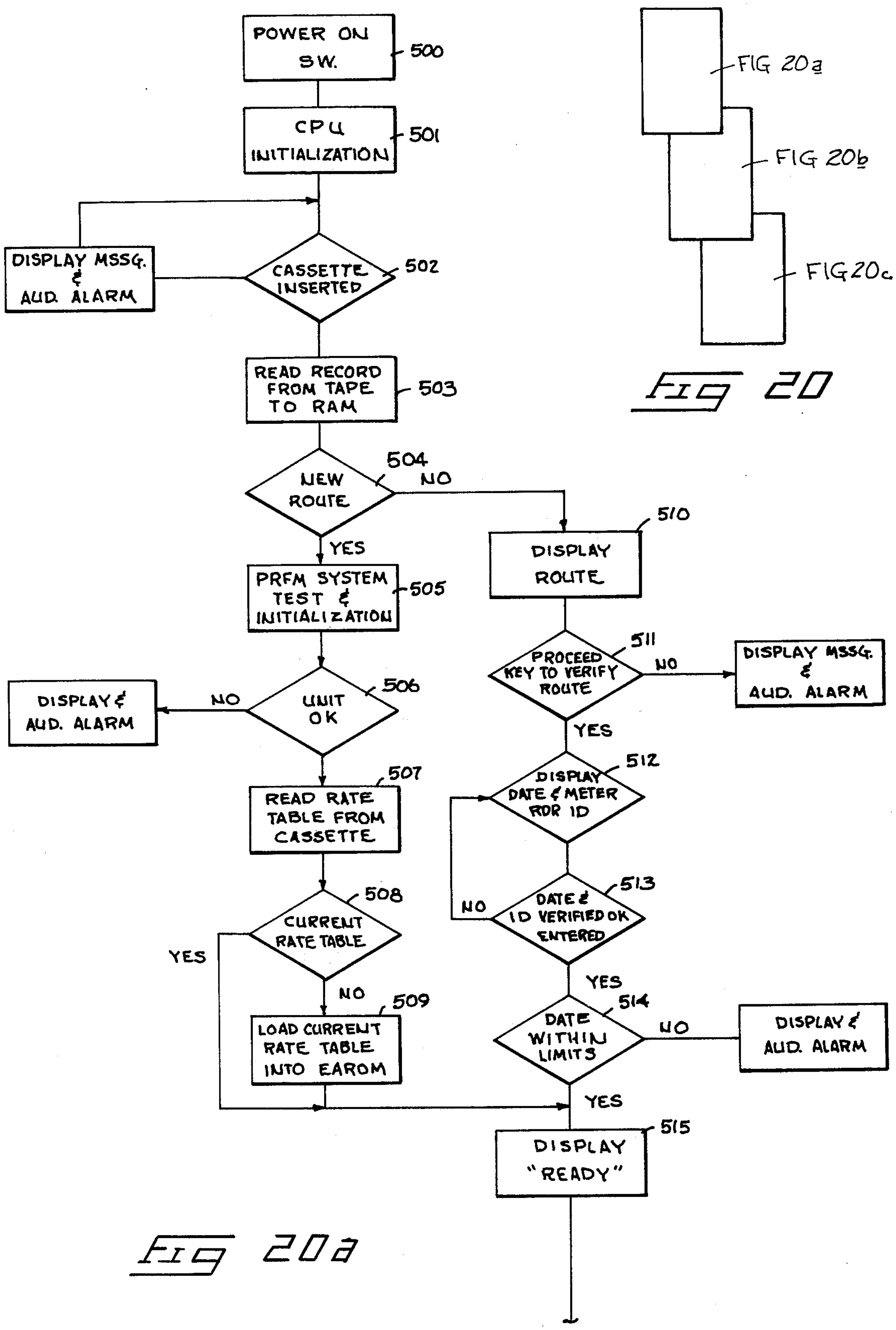
FIGS. 20A, 20B and 20C illustrate flow diagram of a main routine of an instructional control program for the apparatus.
FIG. 20 is a diagram showing how
Figure 20B:
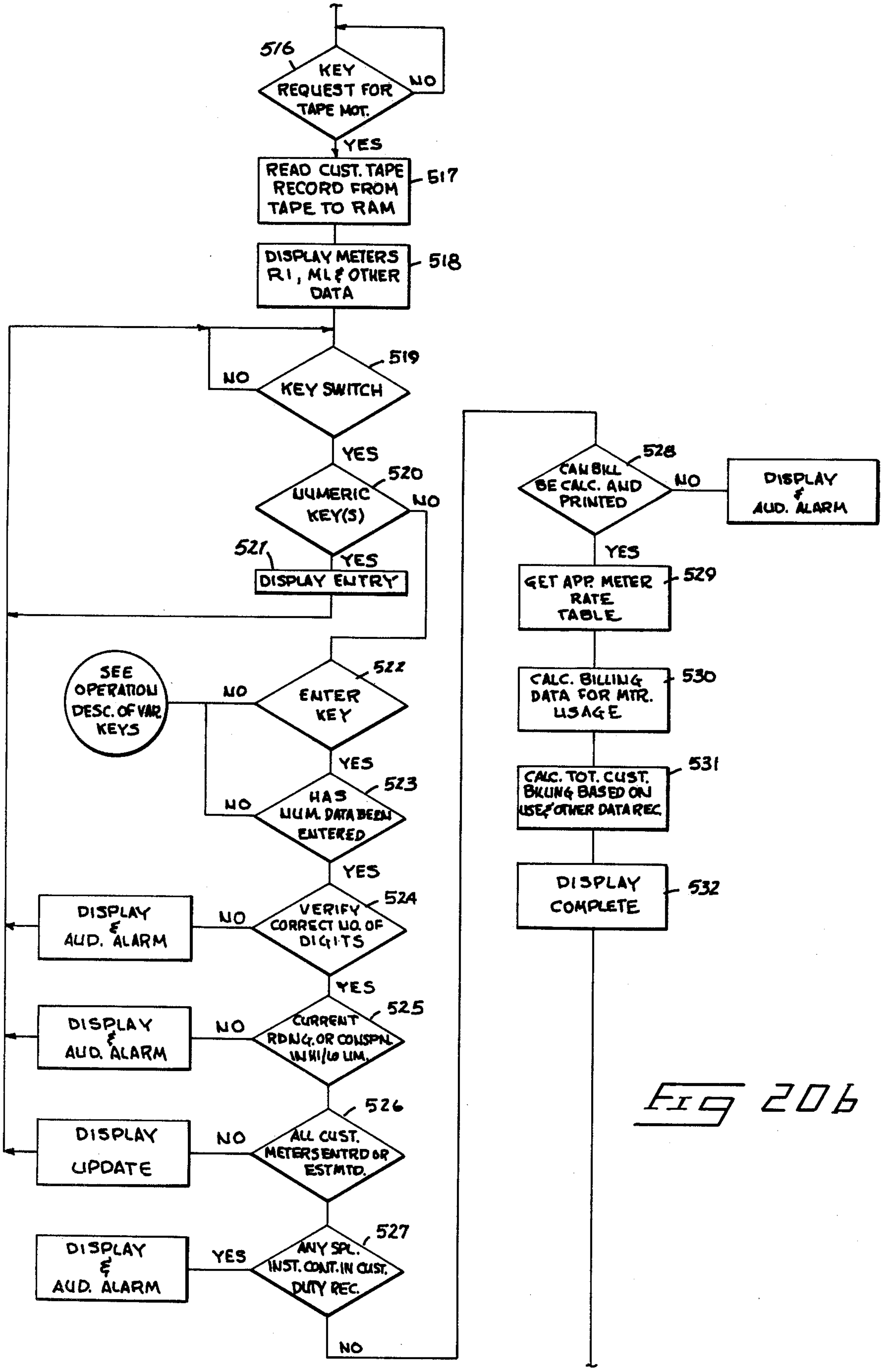
Figure 20C:
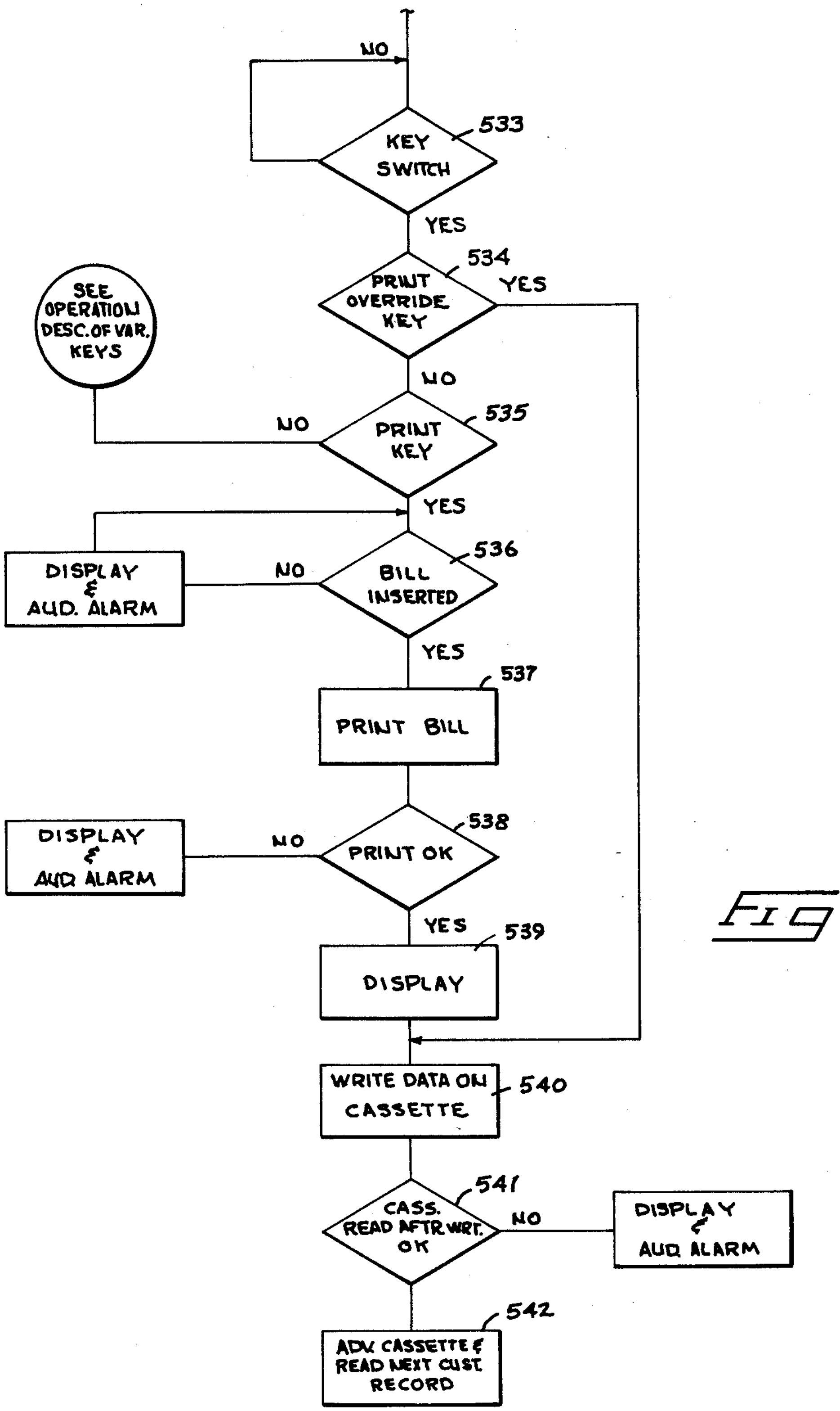

The envelope feed interface section 312 further includes a network 390 interconnected to the feeler switches 211 and 213 as illustrated in FIG. 18. The network 390 provides to the CPU via the Data Bus information concerning the presence, absence and movement of the envelope in the printer. As previously mentioned, the feeler microswitch 211 senses the leading edge and presence of the envelope as it is inserted. When the switch 211 is closed, it grounds a Tri-State bus buffer 392. When the drive roller 206 moves the envelope to the print station, the envelope engages and closes feeler switch 213 which in turn grounds Tri-State bus buffer 394. The status of the switches 211 and 213 is gated onto the Data Bus via an NAND gate 396 controlled by signals from the CPU (MRD) and the I/O control module. The CPU when programmed with the length of the envelope and the number of inches per steps of the paper drive motor, is able to determine a time period in which the envelope should pass the print station. The CPU can determine whether or not the envelope has moved past the microswitches 211 and 213 in the prescribed number of steps. When the switch 211 is opened, the CPU will have sensed the movement of the trailing edge of the envelope. Consequently, it can be easily determined whether or not the envelope has jammed in the guide 200 or whether or not the envelope feed system 192 is properly operating.

Figure 14:
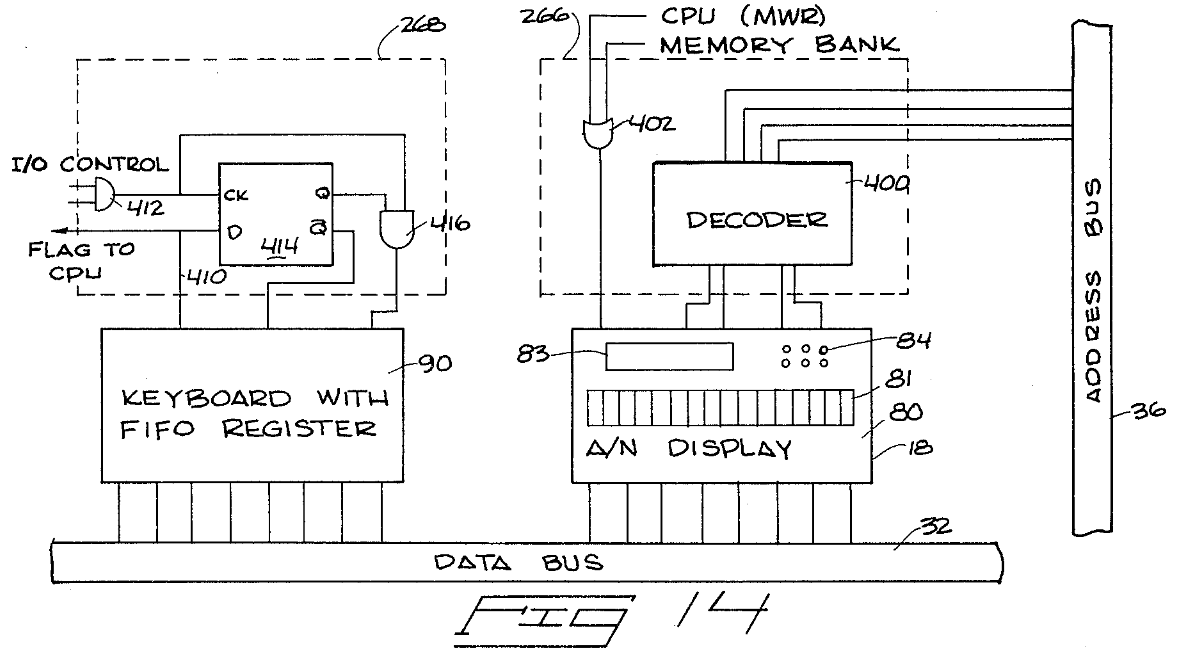
FIG. 14 is a schematic block diagram of a keyboard system and a display system and their accompanying interface.
Figure 15:
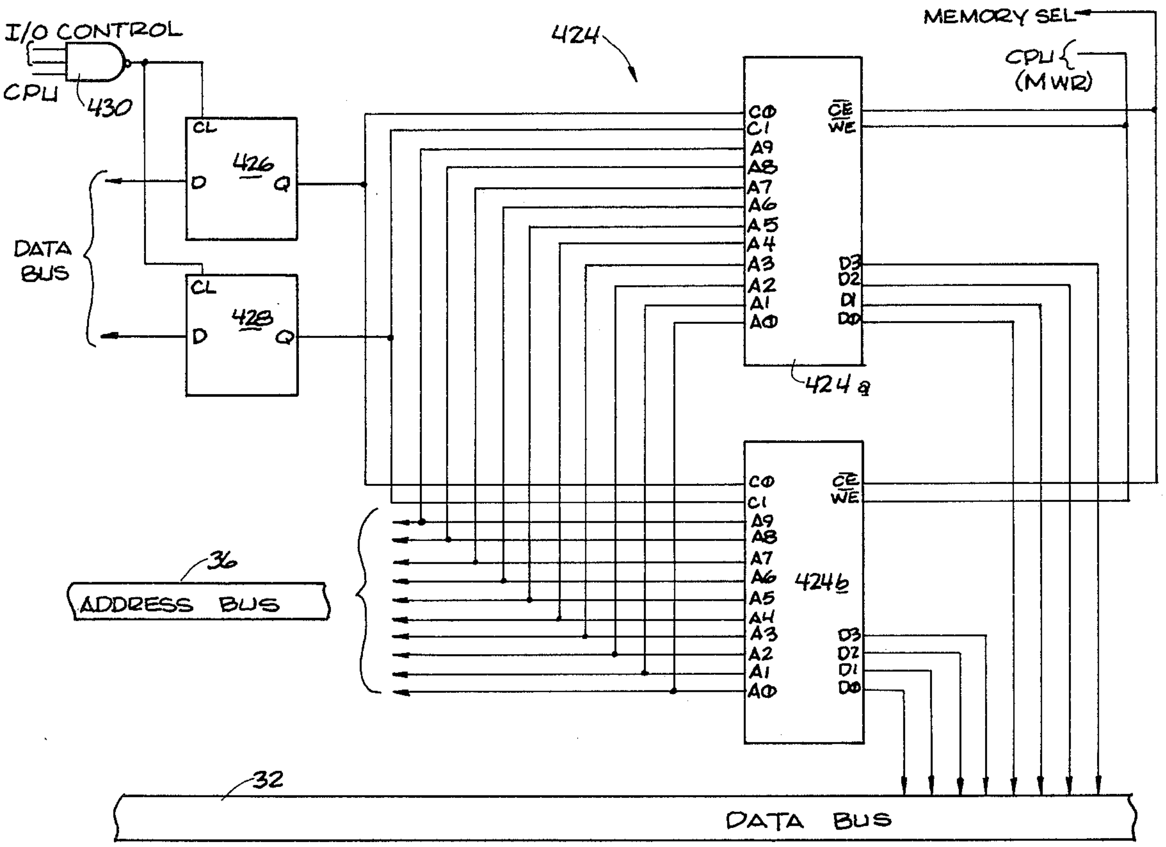
FIG. 15 is a schematic diagram of electronic alterable read-only-memory devices and their interface for storing utility rate tables.

The display interface 266 is shown in schemmatic form in FIG. 14. The alphanumeric section 82 and the numeric section 83 are addressed via the Address Bus 36 with selected address signals being decoded by decoder 400. The display 80 is controlled by signals from the CPU (MWR) and the Memory Select Bank Module through a NOR gate 402. From an operational and control standpoint, the display 80 is viewed similarly as a memory in which the specific coded character to be displayed is placed on the Data Bus 32 and located through signals from the Address Bus 36. As previously mentioned, the display 80 includes its own internal RAM, ROM, character generation and logic which is described in the "Litronix Appnote Number 9 for Applying the DL-1416".

The keyboard interface 268 is illustrated schematically in FIG. 14. As previously mentioned, the keyboard 90 includes a FIFO register which produces a flag signal on flag line 410 to the CPU to signal the CPU that a keyswitch has been depressed. Signals from the CPU through the I/O control are gated through an AND gate 412 to a "D" type flipflop 414 and AND gate 416 to time the gating of the keyboard information onto the Data Bus 32.

The keyboard 90 is viewed as an I/O device with a flag to indicate that the I/O device has information to be placed on the Data Bus. The I/O control module then activates the Data Bus gating to place the keyswitch information on the Data Bus 32 for processing.

Memory

The memory means 20 includes volatile random access memory devices 420 (RAM), electronically programmable read-only-memory devices (EPROMS) 422 and electronically alterable read-only-memory (EAROMS) devices 424 (FIG. 11). The RAMS serve three general functions. The functions are to: (1) temporarily store the customer/meter information unloaded from the magnetic tape; (2) temporarily stored new information supplied through the keyboard prior to be written onto the magnetic tape; and (3) temporary storage calculations and interim data for the microprocessor. The RAMS are of conventional design. In a preferred embodiment, the memory contains an array of sixteen RAMS. Such RAMS may be purchased from the RCA Solid State Division of RCA Company, Part No. 5101 RAMS.

The EPROMS 422 are nonvolatile memory systems which contain the basic operating or instructional control program for the apparatus including special validation routines. The EPROMS are conventional units and may be purchased from Intel Corporation of Santa Clara, CA, Part No. 2716. In a preferred embodiment the memory includes an array of ten EPROMS.

Additionally the memory includes an array of the EAROMS for storing the utility rate tables. The EAROMS are electronically alterable read-only-memories which are additionally nonvolatile and will not lose their contents when power is turned off. An EAROM array 424 is illustrated in more detail in FIG. 16. FIG. 16 shows an array of two EAROMS 424*a* and 424*b*. Such units may be purchased from General Instrument Corporation of Hicksville, N.Y. under Part No. ER3400. Their operation and description is described in GI's "1978" Microelectronics Data Catalog".

The utility rate tables are transferred from the magnetic tape to the EAROMS 424*a* and 424*b* by the CPU through the Data Bus 32. Information to and from the Data Bus 32 and the EAROMS is controlled by signals from the CPU and the Memory Select Bank Module. The address of the information is controlled from the Address Bus through flipflop elements 426 and 428. The flipflops 426 and 428 are controlled by signals from the I/O control and the CPU (TBA) signals through a NAND gate 430. By utilizing the EAROM the apparatus is able to obtain the nonvolatile feature of ROM but additionally provide the versatility to update the rate tables from the magnetic tape. Consequently the utility rate tables may be updated with very little difficulty or expense in modifying or updating the apparatus.

Electronic Serial Number

An additional feature of the apparatus is the provision of an electronic serial number device 450 that is illustrated schematically in FIG. 19. The apparatus has the capability of inserting a unique serial number code onto the magnetic tape so that the utility is able to determine which apparatus was utilized in servicing a particular customer and route.

The electronic serial number device 450 is viewed as an I/O device with respect to the CPU. The electronic signal number device 450 includes two octal latches 452 and 454. The inputs D0–D7 to the latches are connected to either ground of +5 volt DC in a very unique pattern for each device. Because of the number of variables, the circuit may produce over 65,000 unique serial numbers. The input code or serial number is then latched onto the Data Bus through signals from the I/O control module and from the CPU (MRD). The signals from the CPU and the I/O control are processed by NAND gates 458 and 460 for latches 452 and 454 respectively.

The feature of incorporating an electronic serial number that is written onto the tape is very useful for maintenance purposes and for detecting the problems being encountered by the data meter. The Serial Number is recorded on the magnetic tape for each account that is processed. If the optical scanning of the bills has a high number of rejects, the utility company may quickly identify the defective apparatus. The defective apparatus can then be readjusted to bring the print quality back up to the required standard.

As illustrated in FIG. 19 a jumper 462 is connected between the +5 volt DC bus and the input of a terminal of one of octal latch 452 and a jumper 464 is connected between ground and terminal 7 of the octal latch 452. This provides for a unique electronic serial number which is gated onto the Data Bus for recording on the magnetic tape. As previously mentioned such a system can provide over 65,000 unique serial numbers.

Instructional Control Program

Figure 5:
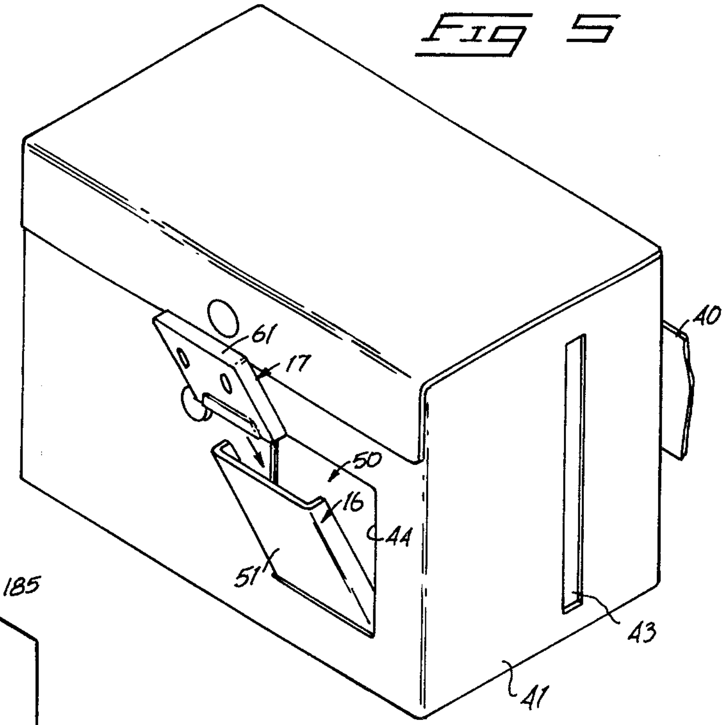
FIG. 5 is an isometric view of a support case for a magnetic tape deck system and a printer system illustrating openings for receiving a cassette tape cartridge and a customer bill.

FIGS. 20-26 show various flow diagrams for an instructional control program stored in the EPROM's and utilized to implement the desired functions. Step 500 indicates activating the apparatus to turn the electrical power "on" by depressing the keyswitch 130. Step 501 indicates the CPU initialization step for initializing the apparatus to determine if all systems are ready for operation. Step 502 determines whether or not the magnetic tape or cassette 61 has been inserted into the tape transport deck 50 as illustrated in FIG. 5. If a cassette has not been inserted into the transport, then a display message is displayed on the alphanumeric display 80. Step 503 causes the data from the magnetic tape to be unloaded into the RAM's 420. In step 504 a check is made to determine whether or not the tape is for a new route (preamble segment 63). If the answer is yes, the apparatus proceeds to step 505 for performing the system test and initialization to determine if all the systems are ready. If all systems are ready as determined in step 506, then the system proceeds to step 507 to compare the rate tables in the cassette with the rate table stored in the EAROMS 424. If the rate table in the EAROMS is the current rate table determined in step 508, then the device proceeds to the "ready" display. If the rate table in the EAROMS is not current, then the device will proceed in step 509 to load or change the EAROMS to include the current rate table.

If in step 504 it is determined that the cassette tape is for an old route, then the apparatus will proceed to step 510 for displaying the route number. The meter reader then is requested in step 511 to push the "proceed" keyswitch 136 if the tape is the proper tape. If the meter reader does not depress the "proceed" keyswitch 136, then the display message and alarm will be activated. If the meter reader depresses the "proceed" keyswitch 136, the apparatus will proceed to step 512 to display the current date that the meters on the route are being read and the meter reader identification number. If the date and "id" of the meter reader are correct, then the meter reader in step 513 depresses the "proceed" pushbutton 136. If the verified keyswitch 156 is depressed the device will accomplish a check in step 514 to determine whether or not the date is within limits. If not, a display and alarm will be made. If the date is within limits to service a customer, the program will then proceed in step 515 to display the message "ready" to indicate that the apparatus is now ready for use in servicing the route. The apparatus will then wait for the meter reader to depress a tape motion keyswitch in step 516.

After the appropriate tape motion keyswitch is depressed, the apparatus in step 517 will load the customer/meter information segments 66 and 67 of the tape into the RAM memory 420. In step 518, customer information and meter information would be displayed on the alphanumeric display for the meter reader's edification in determining the customer's address, meter location and other information that would be helpful to him in reading the customer meter.

In step 519, the apparatus will check to see if a keyswitch has been depressed. If the keyswitch has been depressed step 520 determines if the keyswitch was a numeric keyswitch. If it was a numeric keyswitch that was depressed, the apparatus will then in step 521 display the numeric value on the display to enable the meter reader to determine if the numeric value is correct. If it is correct, then the meter reader will proceed to depress other numeric keys until the full meter reading has been entered. If the last key depressed is not a numeric key then the apparatus will proceed to step 522 to determine whether or not the keyswitch was the "enter" keyswitch 134 to enter the data into the RAM. If the "enter" key 134 was depressed, then a check will be made in step 523 to determine if the correct number of numerical characters have been entered. In step 524, the apparatus will determine whether or not the number has the correct number of digits. If not, an alarm will be activated and the system will then proceed back to step 519 to wait for a keyswitch to be depressed. If the correct number of digits have been entered, then the apparatus will proceed in step 525 to determine whether or not the inserted meter reading is within a predetermined high or low limit. If the reading is outside of the limit then a display alarm signal will be activated to cause the meter reader to verify the reading. If the meter reading is within the high-low limits then the device will proceed in step 526 to check to see if all the meters of the customer have been read or that the RAM has estimated values if one or more of the meters could not be read. The next step 527 involves checking the data received from the cassette to see if there are any special instructions contained in the customer data base. Sometimes the special instructions will include that the bill cannot be estimated and instruct the meter reader not to calculate the bill or that multiple bills should be prepared to give to the customer or that the bill should be returned to the utility company and not be delivered. If the customer meter information contains special instructions, then an alarm and display will indicate such instructions. If no special instructions are included, then the device will proceed in step 528 to check to see if the bill can be calculated and printed. If the bill cannot, an alarm will be activated.

If the bill can be calculated and printed, the device in step 529 will proceed to obtain the current rate utility information from the EAROMS for use in calculation. In step 530, the device wil calculate the bill and enter the information into the RAM. After the usage has been calculated, the device will proceed to step 531 to calculate the total cost to the customer including any previous billings or other cost items that should be included on the bill. After the calculations have taken place, the device will display a message that the calculations are complete and the apparatus is ready to print the bill. In step 533, the apparatus will wait until a keyswitch has been depressed.

When a keyswitch is depressed, the system then will move to step 534 and determine whether or not the keyswitch depressed was the "print override" keyswitch 148. If the "print override" keyswitch 148 is depressed then the unit will proceed downstream to subsequent steps. If the "print override" keyswitch 148 is not activated, then the system will proceed to step 535 to determine if the "print" key 146 has been depressed. If the "print" key 146 has been depressed, then the system in step 536 will determine if a bill has been inserted by the activation of the feeler switch 211. If the bill has been inserted, then the system will proceed to the important step 537 of printing the bill.

In step 538 the apparatus will check to see if the print sequence operated successfully. For example, the system will check to see if the print wheel speed was correct during the printing and whether the bill proceeded through the print station in the proper time span. If the print operation was successful then a message will be displayed in step 539. If the print operation was not successful a display and alarm signal will be activated; plus such information will be loaded into the RAM for subsequent writing onto the magnetic tape. The machine then in step 540 will proceed to write the data contained in the RAM onto the segment 70 of the magnetic tape. As the information is being written onto the tape, the apparatus will proceed to step 541 to perform a read-after-write function to see if the information written onto the magnetic tape is correct. If it is not, then a visual display and audible alarm will be activated. If the information is correct, the data will be "write protected" and the apparatus in step 542 will indicate that the apparatus is now ready for the meter reader to proceed to the next customer and will cycle back to step 516.

Figure 21:
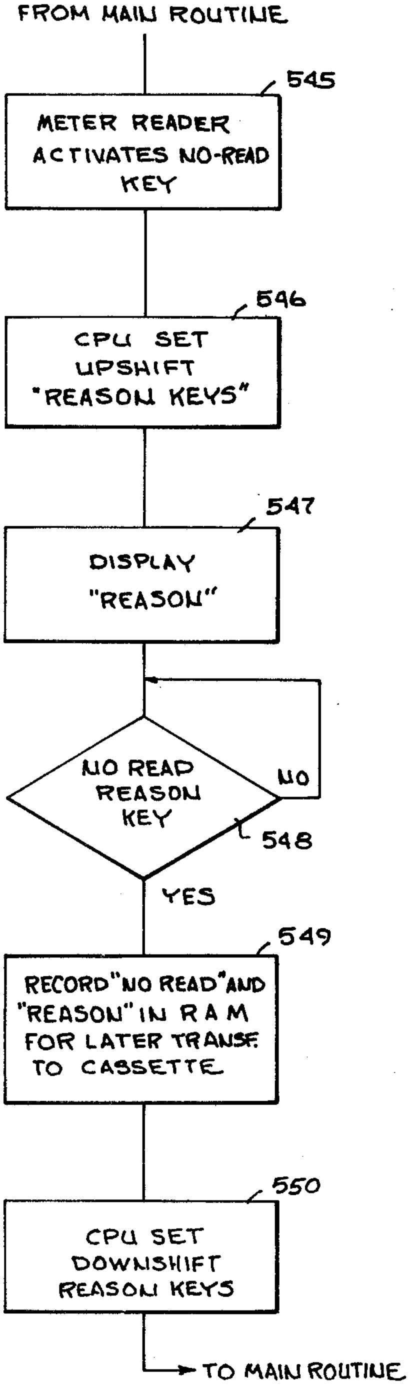
FIG. 21 illustrates a flow diagram of a "Meter-Cannot-Be-Read" subroutine of the instructional control program.

As illustrated in FIG. 21, should the meter reader be unable to read the meter, he depresses the "no read"

keyswitch 165 in step 545 and initiates a special subroutine.

The CPU, in step 546, upshifts the arithmetic keyswitches 94–105. In step 547, the CPU causes the display to display the message "REASON?". In step 548, CPU waits for one of the keys 94–105 to be depressed. In step 549 a code for the depressed reason keyswtich is recorded in the RAM for later transfer to the magnetic tape. In step 550, CPU downshifts the reason keys 94–105 to the arithmetic section and returns the CPU to the regular instructional program routine. If the meter cannot be read, the CPU will determine from the customer information that has been loaded into the RAM whether or not the consumption is estimated. If the consumption is estimated, the apparatus will proceed to the print operation even though the meter cannot be actually read. The reason why the meter cannot be read is transferred from RAM to the cassette and becomes a part of the record that is returned to the utility office. Such information can be readily acted upon either by the maintenance or customer relations to correct the deficiency.

Figure 22:
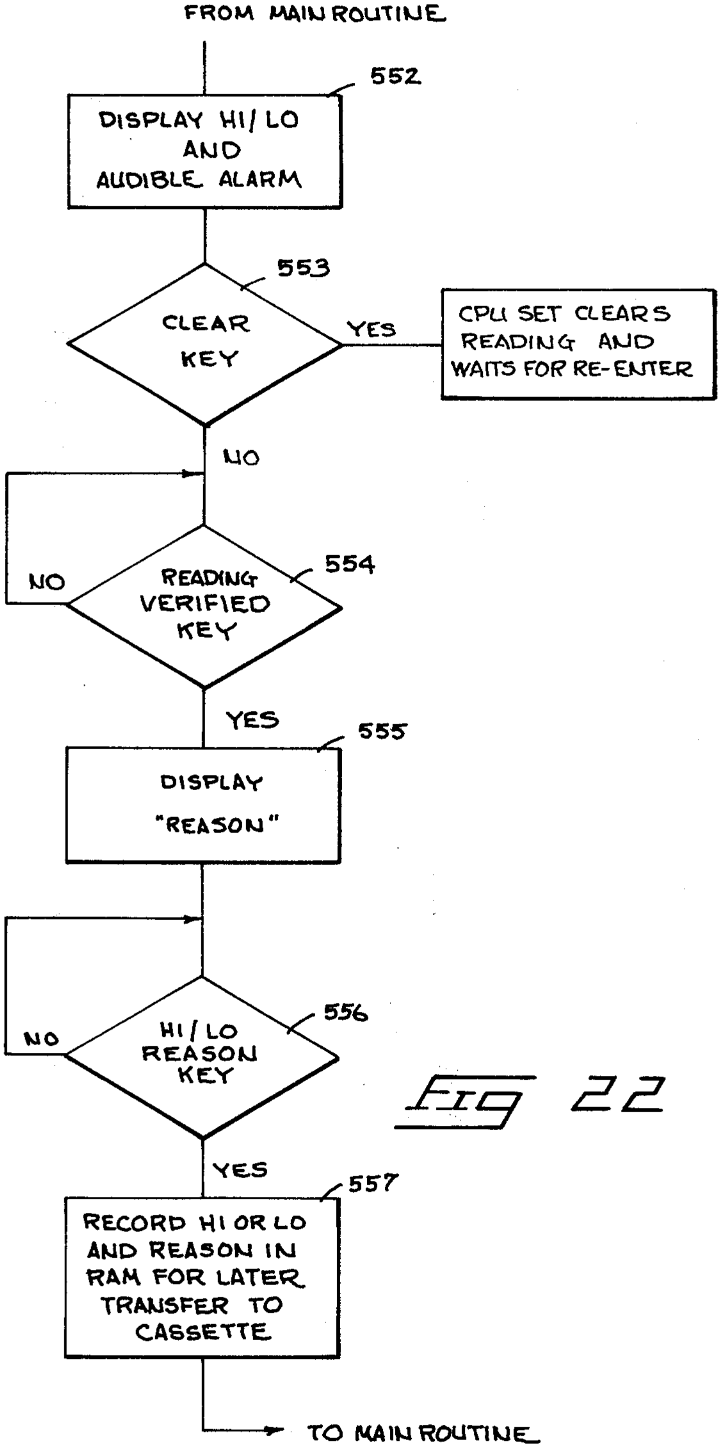
FIG. 22 illustrates a flow diagram of a "Hi-Lo Reading Verification" subroutine of the instructional control program.

In step 525 of the main instructional program routine, a check is made to see whether or not the meter reading is within an estimated high and low limits. If the reading is outside the limits, the instructional program follows a subroutine that is illustrated in FIG. 22. CPU causes the display to indicate that either the high or low limit has been exceeded and will generate an audible alarm in step 552. In step 553, the meter reader may depress the "clear" keyswitch 123 to indicate that the previous reading that was entered is in error. This will cause the CPU to clear the entry register and wait for a new entry. If the "clear" keyswitch 132 is not depressed, then the CPU will in step 554 waits for the reading verifying keyswitch 156 to be depressed. After the "reading verified" keyswitch 156 has been depressed, CPU will in step 555 cause the display to display the message "reason?", to ask the meter reader if he can determine the reason that the verified reading exceeded the high or low limits. If the meter reader can determine by observation the reason for the abnormal reading, he may depress the "observed hi-lo" keyswitch 158. If the meter reader contacts the customer to determine the reason for the abnormal reading, the meter reader then presses the customer "hi-lo" keyswitch 160. This is accomplished in the program step 556. In step 557, the fact that the meter reader had verified the reading, etc. is entered into the RAM for later transfer to the magnetic tape. After step 557, the subroutine is returned to the main routine for further processing and printing of the customer's bill.

Figure 23:
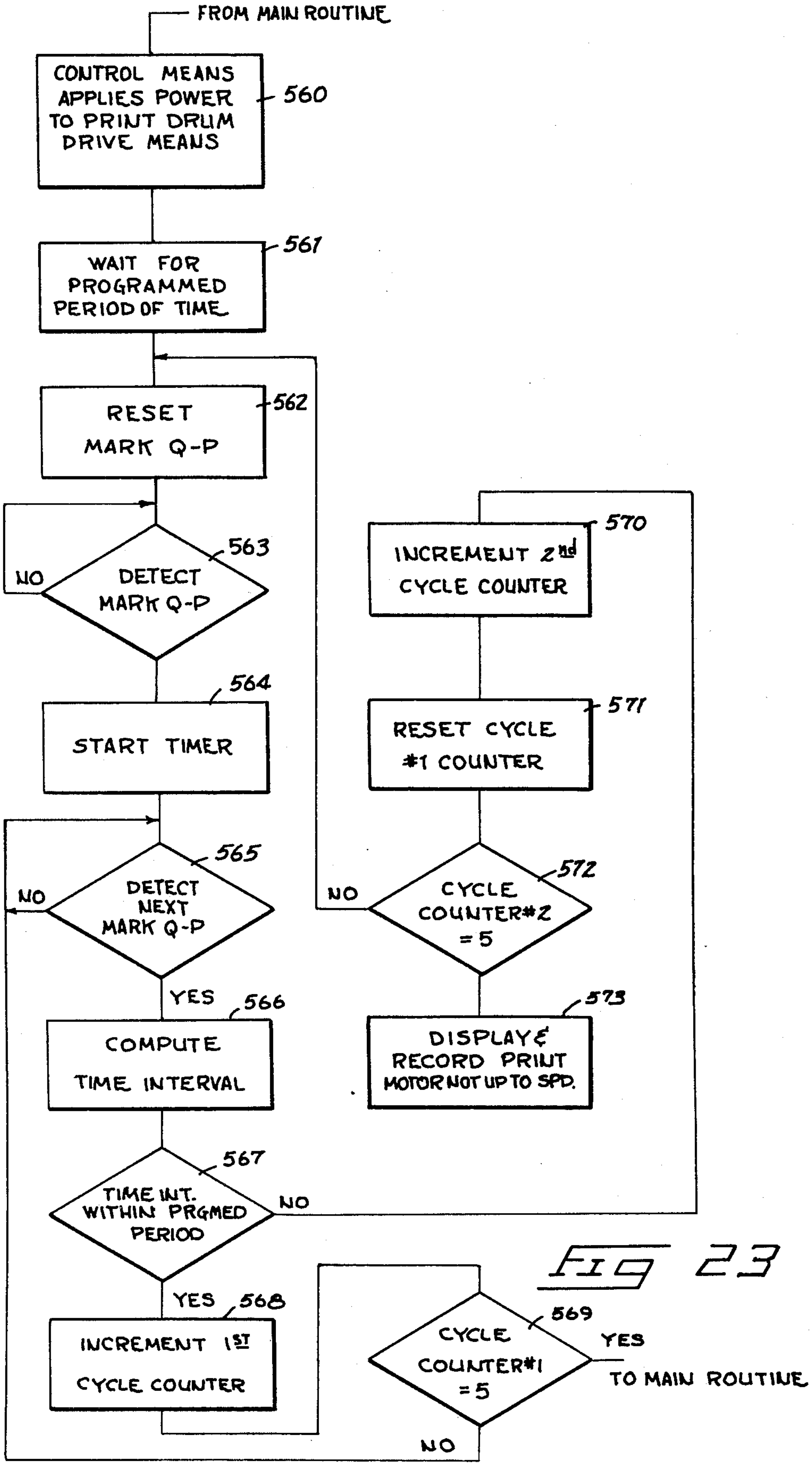
FIG. 23 illustrates a flow diagram for a "Print Drum Drive Failure" subroutine of the instructional control program.

During the printing operation it is important to determine whether or not the printing cycle was successful or whether perhaps an error in the printing operation has occurred. FIG. 23 shows a printer subroutine for checking to see whether or not there is a likelihood of a printer error. In step 560, the CPU applies power to the print drum drive means to cause the motor 219 to be operated. In step 561, the CPU waits for a period of time (2–3 sec.) before checking to see if the motor 219 is at the selected speed. In step 562, CPU through the decoder 320 generates a "RMARK Q-P" signal on line 7 of decoder 320 to reset the flipflop 362. In step 563, CPU waits to receive a mark signal generated by the sensor 226 which is loaded onto the Data Bus through the driver buffer 364. When the mark signal is received, a start timer is activated in step 564 to begin a timing cycle to determine the time period between timing pulses. In step 565, the system waits to detect the next mark pulse from the succeeding timing mark 223. In step 566, the CPU causes the system to calculate the time differential between the first mark pulse and the second mark pulse. In step 567, the time period is evaluated to determine whether or not it is within a preselected period of time. If the time period is correct, a counter is activated in step 658 to indicate that the speed was correct once. The system recycles several more times to see if the time period is within limits for subsequent timing periods. If the time period is within limits for a selected continuous number of cycles the counter will generate a signal that the print wheel speed is correct. If at any time, the time period is outside the limits, step 570 will start a second counter to determine the number of time periods outside the limits. In step 571, the second counter is reset to start counting. If the second counter counts a preset number of time periods outside the limits, then an alarm will be actuated in step 572 to indicate that the print wheel motor is not up to speed.

Figure 24:
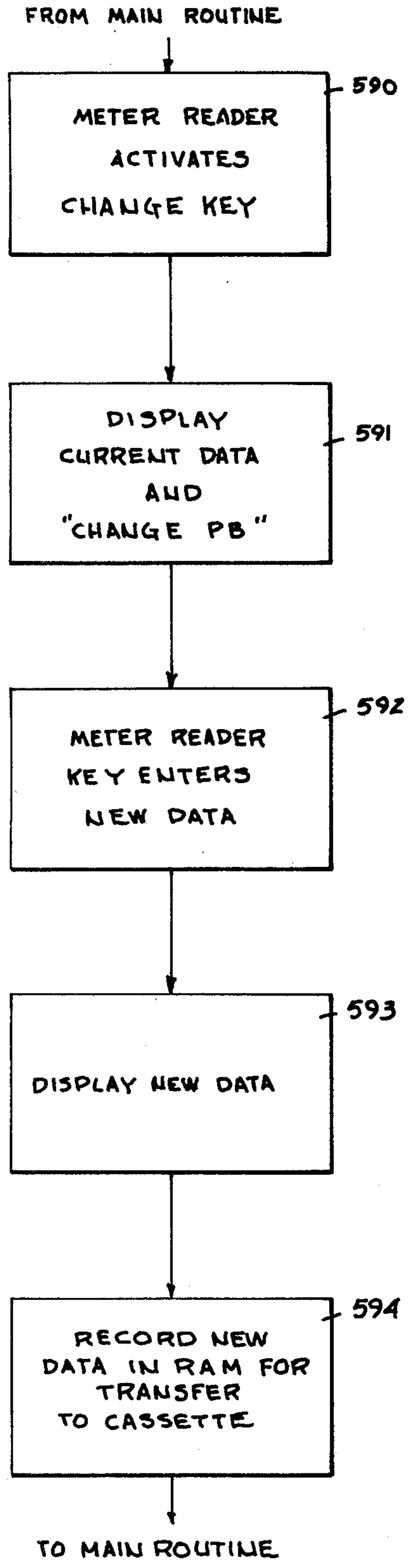
FIG. 24 illustrates a flow diagram of a "Change or Update General Customer Meter Information" subroutine of the instructional control program.

The customer/meter information contains instructions for the meter reader as to the location of where he is to place the customer bill after it is printed. If either he or the customer wishes to have the customer bill deposited at a different location, the meter reader may enter this information into the device by depressing the "change PB" keyswitch 116. When keyswitch 116 is depressed, the CPU causes the current location to be displayed with the message "CHANGE PB" in step 591 (FIG. 24). The meter reader in step 592 then enters the new coded location where the customer bill is to be placed. In step 593, CPU causes the display to display the new coded information to determine if that is correct. The meter reader then depresses the "ENTER DATA" keyswitch 134 to enter this information into the RAM for later transfer to the magnetic tape. This is accomplished in step 594. After this is accomplished, the CPU returns to the main routine. Other changes may be entered in a similar fashion using keyswitches 114 and 118.

Figure 26:
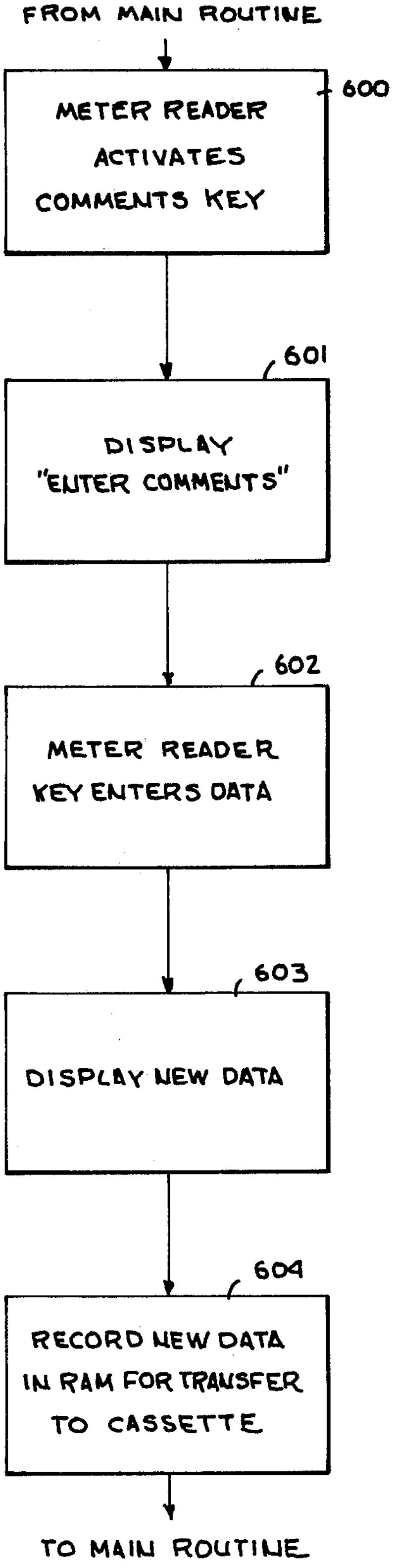
FIG. 26 illustrates a flow diagram of an "Enter Comments" subroutine of the instructional control program.

On some occasions it may be desirable for the meter reader to enter comments concerning observations he has made concerning either the meter or the location. To accomplish this, the meter reader depresses·the "COMMENT" keyswitch 170 to begin a subroutine in step 600 (FIG. 26). The CPU then in step 601, causes the display to display the message "ENTER COMMENTS" indicating that the apparatus is ready to receive coded information. For example, it may be desirable to indicate that the glass on the meter is broken or that the meter has been tampered with or that some other maintenance procedure is required. Through the arithmetic keys 94–105, the meter reader enters a coded information in step 602. In step 603 the information is displayed to the meter reader to determine if the information entered is correct. The meter reader then depresses the "enter" key 134 to enter the coded information into the RAM for later transfer to the magnetic tape for that particular customer. After step 604, the operational program is returned to the main routine.

Figure 25:
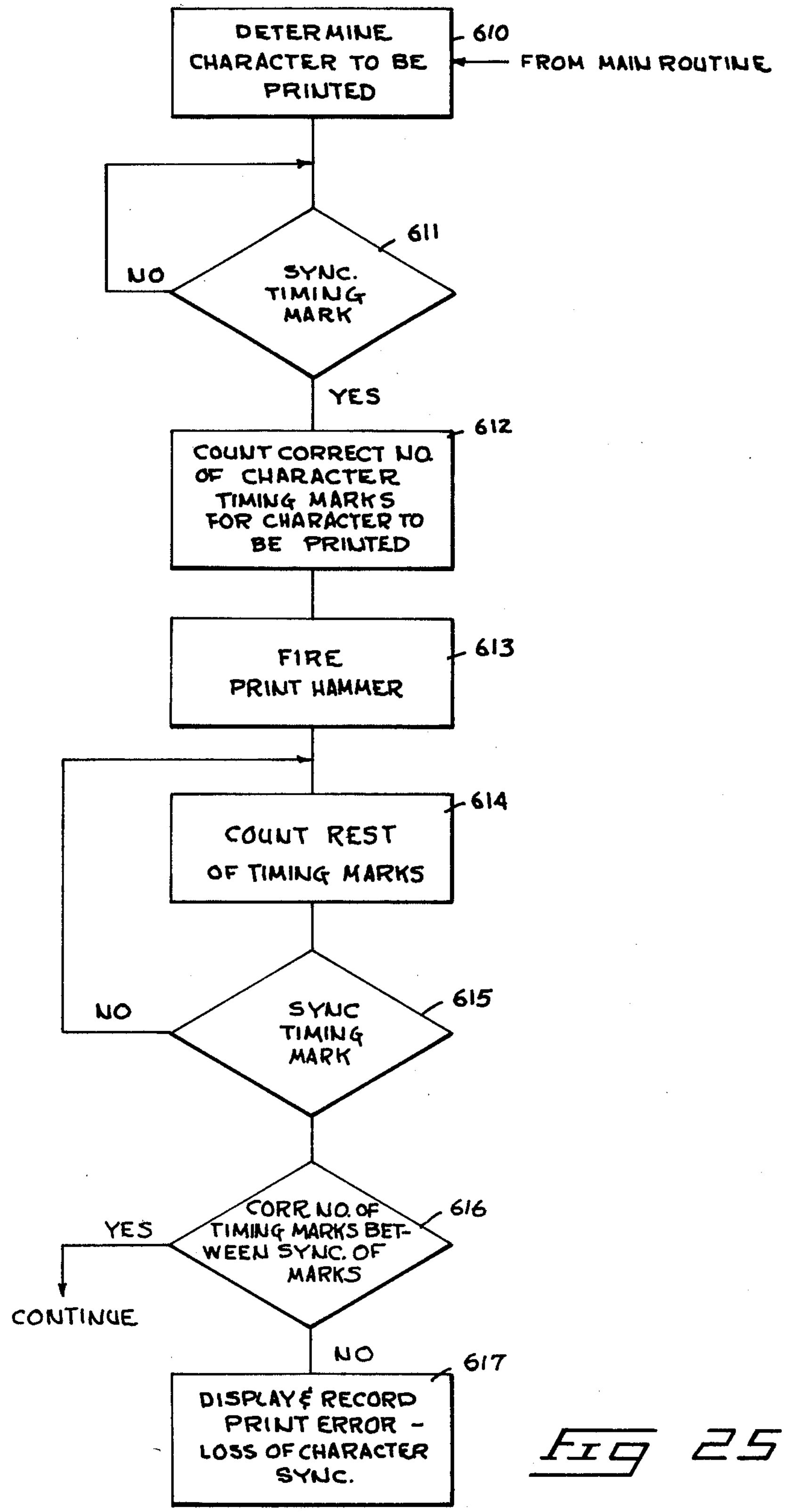
FIG. 25 illustrates a flow diagram of a "Loss of Print Character Synchronization" subroutine of an instructional control program.

In conjunction with determining whether or not the print wheel motor 219 is operating at the proper speed, it is also important to determine whether or not the printer is printing the desired numerical character. This is accomplished by checking the synchronization of the printing cycle to determine whether or not synchronization has been lost. A subroutine is illustrated in FIG. 25. In step 610, the CPU determines which character is to be printed. In step 611, CPU determines when the synchronization mark 225 has been detected by the sensor 226. After the synchronization mark has been detected, in step 612, CPU counts the correct number of character timing marks 223 between the synchronization mark and the character to be printed. When the designated character to be printed is at the print station, the CPU fires the appropriate print hammer by signals presented on the Data Bus that are decoded by decoder 320 as indicated on the output lines 4 or 5 of decoder 320.

In step 614, the CPU counts the timing marks 223 subsequent to the print hammer firing until the sync timing mark 225 is again noted. If the correct number of timing marks between the character that was designated and the synchronization mark is correct, the process is returned to the main routine and a correct printing operation is indicated in step 538. If the number of timing marks between the timing mark corresponding to the selected character and the sync mark is not correct, then the system has lost synchronization. In step 617, a display message is displayed indicating that there has been a loss of synchronization and a probable printing error.

Figure 27:
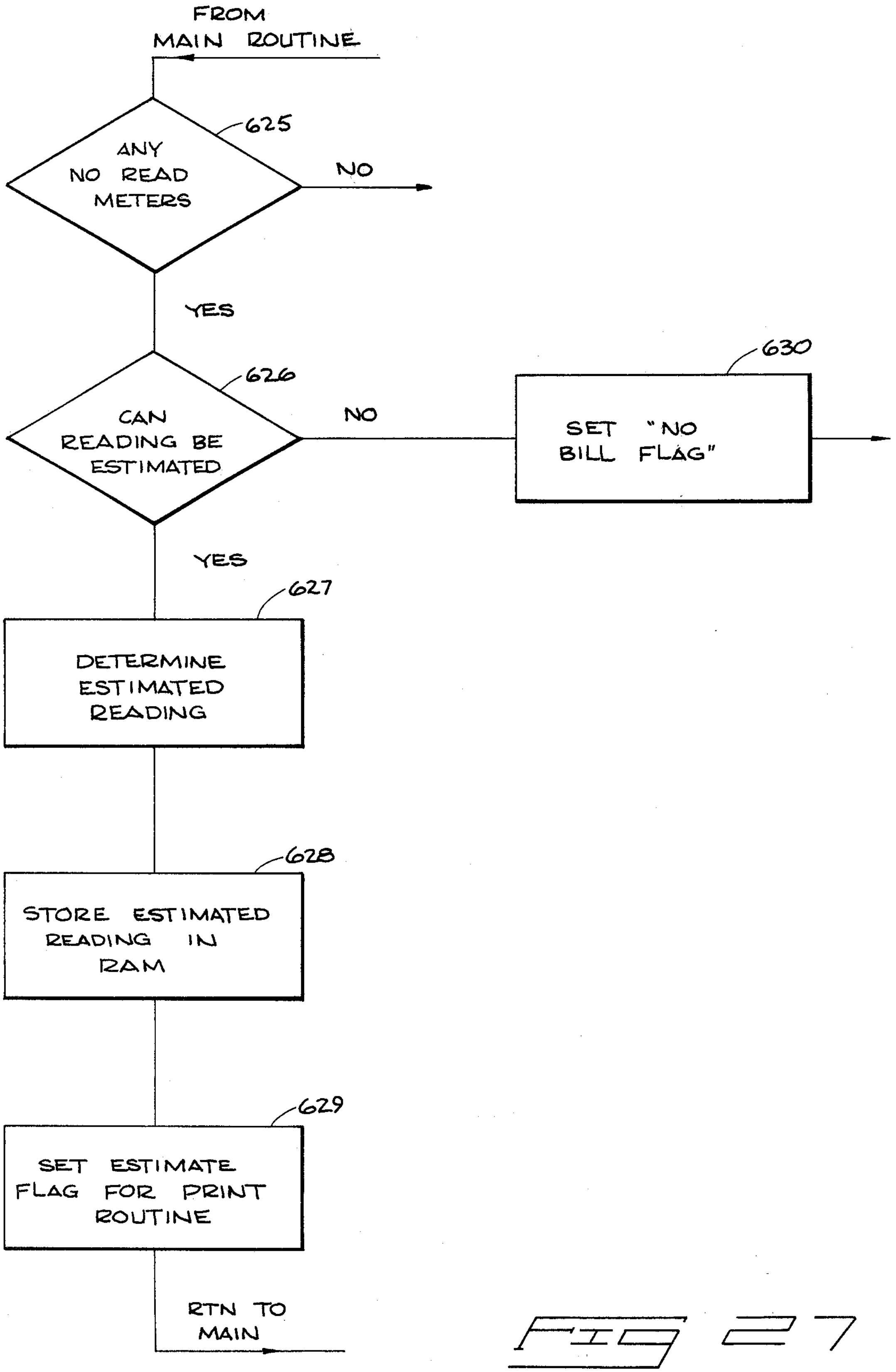
FIG. 27 illustrates a flow diagram for an Estimated Bill Subroutine of the instructional control program.

The apparatus is frequently able to print an estimated amount on the customer bill even though the meter could not be read. The apparatus can provide an estimated amount based upon the estimated usage projection either made by the utility company or calculated by the apparatus based upon data prerecorded on the magnetic tape. FIG. 27 illustrates a subroutine for estimating the meter reading even though the meter cannot be read. In step 625, the apparatus checks to see if the "No RD" keyswitch 165 has been depressed. If not, the instructional program returns to the main routine. If yes, the apparatus in step 625 determines whether there is sufficient information to estimate the meter reading. If there is, the apparatus in step 627 determines the estimated reading either directly from the projection made by the utility company or by calculations based upon previous usage contained in the customer information file prerecorded on the magnetic tape. In step 628, the estimated reading is entered into memory. In step 629, a flag is set in the print routine to print the customer bill with a notation on the bill that the meter reading is estimated. If the meter reading cannot be estimated, the apparatus in step 630 sets a "No Bill" flag in the main routine (step 526) so that no bill will be printed for that customer.

The above described apparatus significantly increases the accuracy and completeness of the meter reading process, reduces manual data entry and auditing operations, streamlines computer entry of data and has a major impact in the reduction of mail and short term interest costs normally incurred by a utility company. Additionally the unit is extremely lightweight and weighs less than 10 lbs. and can easily be carried by the utility meter reader for a six to eight hour period without fatigue or discomfort. Additionally, the apparatus enables the meter reader to enter a significant amount of information that is helpful to maintenance and customer service so that the utility may be more responsive to the needs of the customer and detect defects in the service and equipment.

Additionally, the apparatus is extremely versatile and is easily adaptable to the many public and private utilities having different business and operational procedures. Such procedures vary widely from different parts of the country depending upon whether or not the utility is involved in the supply of gas, electricity, water or steam. Additionally, it should be noted that the apparatus is able to print a bill based upon the estimated consumption even though the meter was unable to be read. This greatly enhances the ability of the utility company to have a high percentage of bills that are actually delivered to the customer rather than having to prepare the bills at the utility office. The system enables the utility to greatly increase its effectiveness with customer relations by being more responsive to the customer. The meter reader participates more effectively in the customer relationship role.

It should be understood that the above described embodiment is simply illustrative of the principals of this invention and numerous other embodiments may be readily devised without deviating therefrom. Only the following claims are intended to limit or define this invention.

What is claimed is:

1. A portable utility billing apparatus for enabling a utility meter reader to: (1) read utility meters of a plurality of utility customers on a selected route and obtain current meter value information concerning such customers: (2) record the current meter value information; (3) calculate customer utility charges; (4) print customer bills contained in an enclosed envelope with the calculated customer charges thereon; and (5) deliver the enclosed bills to the selected route customers; said apparatus comprising:

a portable support to be carried by the meter reader;

a mass data storage receiving means mounted on the support for receiving a mass data storage device containing previous meter value information and general customer/meter information;

a numeric display means for visually displaying information to the utility meter reader;

a memory means containing utility rate tables and an instructional control program;

a data entry means for enabling the utility meter reader to enter the current meter value information;

an arithmetic calculating means for receiving the previous meter value information, the utility rate tables and the current meter value information and calculating the customer charges;

a bill printing means mounted on the support for processing the enclosed envelope and printing the customer charges onto the customer bill through the envelope while enclosed in the envelope;

an electrical battery means mounted on the support as a source of electrical energy;

control means responsive to the instructional control program and operatively connected to various other means to utilize electrical energy from the electrical battery means for: (1) reading the general customer/meter information from the mass storage device and displaying such general customer/meter information on the numeric display means to assist the meter reader in reading the meters; (2) entering the current meter value information from the data entry means and displaying the current meter value information on the numeric display; (3) writing the current meter value information into the mass data storage device to record the same; (4) operating the arithmetic calculating means to calculate the customer charges based upon the utility rate tables, current meter value information and previous meter value information; (5) writing the calculated customer charges into the mass data storage means; and (6) operating the bill printing means to process the enclosed envelope and print the customer charges on the enclosed customer bill while in the envelope to enable the meter reader to deliver the enclosed envelope containing the printed customer bills to the customers without the meter reader physically touching the bills.

2. The portable utility billing apparatus as defined in claim 1 wherein the bill printing means includes: (1) a rotatable print drum containing numerical characters; (2) drum drive for rotating the wheel to sequentially move the characters to a print station; (3) an envelope guide extending tangentially past the print drum at the print station; (4) envelope drive means for moving the enclosed envelope with the customer bill contained therein past the print station; (5) movable impact hammer means at the print station; and (6) hammer drive means for selectively moving the hammer toward the periphery of the print drum to engage the envelope and move the envelope against the print wheel to print a selected numerical character onto the customer bill inside the envelope.

3. The portable utility billing apparatus as defined in claim 2 wherein the bill printing means includes a timing means associated with the print drum to detect when any one of the numerical characters is at the print station; and wherein the control means includes synchronization means operatively connected to the timing means for determining when the selected numerical character is at the print station.

4. The portable utility billing apparatus as defined in claim 3 wherein the timing means has means for sensing the rotational speed of the print drum and wherein the control means includes comparing means for comparing the sensed rotational speed of the print drum with a prescribed speed range and for operating the display means to display an appropriate message when the sensed rotational speed is outside the prescribed speed range.

5. The portable utility billing apparatus as defined in claim 3 wherein the bill printing means includes (a) a synchronization mark on the print drum and (b) sensing means for detecting the movement of the synchronization mark past a print drum timing station and wherein the synchronization means is operatively connected to the sensing means to compare the actual phase of the synchronization mark as sensed by the sensing means with a preset phase and for operating the display means to display an appropriate message when the synchronization mark is not in phase with the preset phase.

6. The portable utility billing apparatus as defined in claim 4 wherein the control means additionally writes the appropriate message into the mass data storage means when the sensed rotational speed is outside the prescribed speed range.

7. The portable utility billing apparatus as defined in claim 5 wherein the control means additionally writes the appropriate message into the mass data storage means when the synchronization mark is not in phase with the preset phase.

8. The portable utility billing means as defined in claim 2 wherein the bill printing means includes edge detector means associated with the envelope guide to detect the edge of the enclosed envelope in the envelope guide; and wherein the control means includes means operatively connected to the detector means for determining whether the envelope was moved past the print drum in a programmed period of time which is indicative of a satisfactory printing operation.

9. The portable utility billing apparatus as defined in claim 8 wherein the control means includes means for operating the display means to display a message that the bill printing operation was unsatisfactory when the programmed period of time is exceeded.

10. The portable utility billing means as defined in claim 9 wherein the control means includes means for writing into the mass data storage device information as to whether the printing operation was satisfactory or unsatisfactory.

11. The portable utility billing means as defined in claim 2 wherein the envelope drive means includes a DC electric drive motor and wherein the control means includes an envelope drive circuit for sequentially applying DC electrical pulses to the DC motor to rotate the drive DC motor to feed the envelope past the print station.

12. The portable utility billing means as defined in claim 2 wherein the envelope drive means includes a multiphase DC stepping motor and wherein the control means is operatively connected to the stepping motor to sequentially activate and deactivate the stepping motor to incrementally move the envelope past the print station with the envelope being stationary when the desired numerical character is at the print station and the hammer drive means is operated to enable the numerical character to be printed on the customer bill.

13. The portable utility billing means as defined in claim 2 wherein the bill printing means includes an envelope sensing means associated with the envelope guide to sense the presence or absence of an enclosed envelope in the envelope guide and wherein the control means is operatively connected to the envelope sensing means for activating the envelope drive means only when an envelope is present in the envelope guide.

14. The portable utility billing apparatus as defined in claim 1 wherein the portable support has a belt assembly with a printer compartment receiving and supporting the bill printing means in which the compartment has an entrance to enable the meter reader to load an envelope therein and an exit to enable the bill printing means to eject the loaded envelope after the enclosed bill has been printed.

15. The portable utility billing apparatus as defined in claim 3 wherein the bill printing means includes (a) a synchronization mark on the print drum and (b) sensing means for detecting the movement of the synchronization mark past a print drum timing station and wherein the synchronization means is operatively connected to the sensing means to compare the actual phase of the synchronization mark as sensed by the sensing means with a preset phase and for operating the display means to display an appropriate message when the synchronization mark is not in phase with the preset phase; and wherein the control means additionally writes the appropriate message into the mass data storage means when the sensed rotational speed is not in phase with the preset phase.

16. A portable utility billing apparatus for enabling a utility meter reader to: (1) read utility meters of a plurality of utility customers on a selected route and obtain current meter value information concerning such customers: (2) record the current meter value information;

(3) calculate customer utility charges; (4) print customer bills with the calculated customer charges thereon; and (5) deliver the bills to the selected route customers; said apparatus comprising:

a portable support to be carried by the meter reader;

a mass data storage receiving means mounted on the support for receiving a mass data storage device containing previous meter value information and general customer/meter information;

a numeric display means for visually displaying information to the utility meter reader;

a memory means containing utility rate tables and an instructional control program;

a data entry means for enabling the utility meter reader to enter the current meter value information;

an arithmetic calculating means for receiving the previous meter value information, the utility rate tables and the current meter value information and calculating the customer charges;

a bill printing means mounted on the support for processing the bills and printing the customer charges on the customer bills;

wherein the bill printing means includes: (1) a rotatable print drum having numerical characters formed circumferentially on a periphery thereof; (2) drum drive for rotating the drum to sequentially move the characters to a print station; (3) bill guide extending tangentially past the print drum at the print station; (4) bill drive means for moving the bill past the print station; (5) movable impact hammer means at the print station; and (6) hammer drive means for selectively moving the hammer toward the periphery of the print drum to move the bill toward the print wheel to print a selected numerical character onto the customer bill;

an electrical battery means mounted on the support as a source of electrical energy;

control means responsive to the instructional control program and operatively connected to various other means to utilize electrical energy from the electrical battery means for: (1) reading the general customer/meter information from the mass storage device and displaying such general customer/meter information on the numeric display means to assist the meter reader in reading the meters; (2) entering the current meter value information from the data entry means and displaying the current meter value information on the numeric display; (3) writing the current meter value information into the mass data storage device to record the same; (4) operating the arithmetic calculating means to calculate the customer charges based upon the utility rate tables, current meter value information and previous meter value information; (5) writing the calculated customer charges into the mass data storage means; and (6) operating the drum drive, bill drive means, and hammer drive means to print the customers charges on the customer bills to enable the meter reader to deliver the printed customer bills to the customers.

17. The portable utility billing apparatus as defined in claim 16 wherein the bill printing means includes a timing means associated with the print drum to detect when any one of the numerical characters is at the print station; and wherein the control means includes synchronization means operatively connected to the timing means for determining when the selected numerical character is at the print station; and wherein the timing means has means for sensing the rotational speed of the print drum and wherein the control means includes comparing means for comparing the sensed rotational speed of the print drum with a prescribed speed range and for operating the display means to display an appropriate message when the sensed rotational speed is outside the prescribed speed range.

18. The portable utility billing means as defined in claim 16 wherein the bill printing means includes edge detector means associated with the bill guide to detect the edge of the bill in the bill guide; and wherein the control means includes means operatively connected to the detector means for determining whether the bill was moved past the print drum in a programmed period of time which is indicative of a satisfactory print operation; and wherein the control means includes (1) means for operating the display means to display a message that the bill printing operation was unsatisfactory when the programmed period of time is exceeded; and for writing into the mass data storage device information that the printing operation was unsatisfactory.

19. The portable utility billing means as defined in claim 16 wherein the bill drive means includes a DC electric drive motor and wherein the control means includes a bill drive circuit for sequentially applying DC electrical pulses to the DC motor to rotate the drive motor to feed the bill past the print station.

20. The portable utility billing means as defined in claim 16 wherein the rotatable print drum includes more than one peripheral row of numerical characters in which each row corresponds to a separate meter to enable the bill printing means to print charges for each meter on a separate print line on a single bill.

21. The portable utility billing apparatus as defined in claim 16 wherein the portable support has a printer compartment receiving and supporting the bill printing means in which the compartment has an entrance to enable the meter reader to load a bill therein and a separate exit to enable the bill printing means to eject a printed bill from the exit and permit an unprinted bill to be inserted into the printer compartment through the entrance.

* * * * *